(12) United States Patent
Kondo et al.

(10) Patent No.: US 9,555,667 B2
(45) Date of Patent: Jan. 31, 2017

(54) PUNCTURE-FREE INNER TUBE

(71) Applicant: KABUSHIKIGAISHA KATAZEN

(72) Inventors: Kumeo Kondo, Aichi (JP); Nobuji Kato, Aichi (JP); Yuuichi Kondo, Aichi (JP); Makane Fukushima, Aichi (JP)

(73) Assignee: KABUSHIKIGAISHA KATAZEN, Aichi (JP)

( * ) Notice: Subject to any disclaimer, the term of this patent is extended or adjusted under 35 U.S.C. 154(b) by 414 days.

(21) Appl. No.: 14/140,925

(22) Filed: Dec. 26, 2013

(65) Prior Publication Data

US 2014/0261945 A1    Sep. 18, 2014

(30) Foreign Application Priority Data

Mar. 12, 2013  (JP) .................................. 2013-49151
Oct. 17, 2013  (JP) ................................ 2013-215930

(51) Int. Cl.
*B60C 5/00* (2006.01)
*B60C 5/04* (2006.01)
*B60C 19/12* (2006.01)

(52) U.S. Cl.
CPC ............... *B60C 5/04* (2013.01); *B60C 19/122* (2013.04); *B60C 2200/12* (2013.04)

(58) Field of Classification Search
CPC ................ B60C 5/00; B60C 5/02; B60C 5/04; B60C 5/08; B60C 5/10
See application file for complete search history.

(56) References Cited

FOREIGN PATENT DOCUMENTS

| DE | 102005006805 | * | 8/2006 |
| FR | 1012684 | * | 7/1952 |
| JP | 2005-205885 | | 8/2005 |
| JP | 2010-111378 | | 5/2010 |
| JP | 2010-210930 | | 9/2010 |

OTHER PUBLICATIONS

Machine translation of FR 1012684, 1952.*

* cited by examiner

*Primary Examiner* — Justin Fischer
(74) *Attorney, Agent, or Firm* — Wenderoth, Lind & Ponack, L.L.P.

(57) ABSTRACT

A puncture-free inner tube has a hollow pipe shape, which is to be inserted in an annular space of an outer tire, which is to be mounted detachably on a tire rim having an annular shape. The tube contains a thermoplastic elastomer molded by injection molding into a transversal cross sectional shape that is similar or substantially similar to and is slightly larger than a transversal cross section of the annular space of the outer tire. The tube has a thickness that is gradually increased from a ground part toward an anti-ground part on a side of the tire rim. The tube is formed in an annular shape, and the tube is to be inserted in the annular space of the outer tire in a compressed state with a tensile stress of the outer tire.

10 Claims, 26 Drawing Sheets

FIG. 3
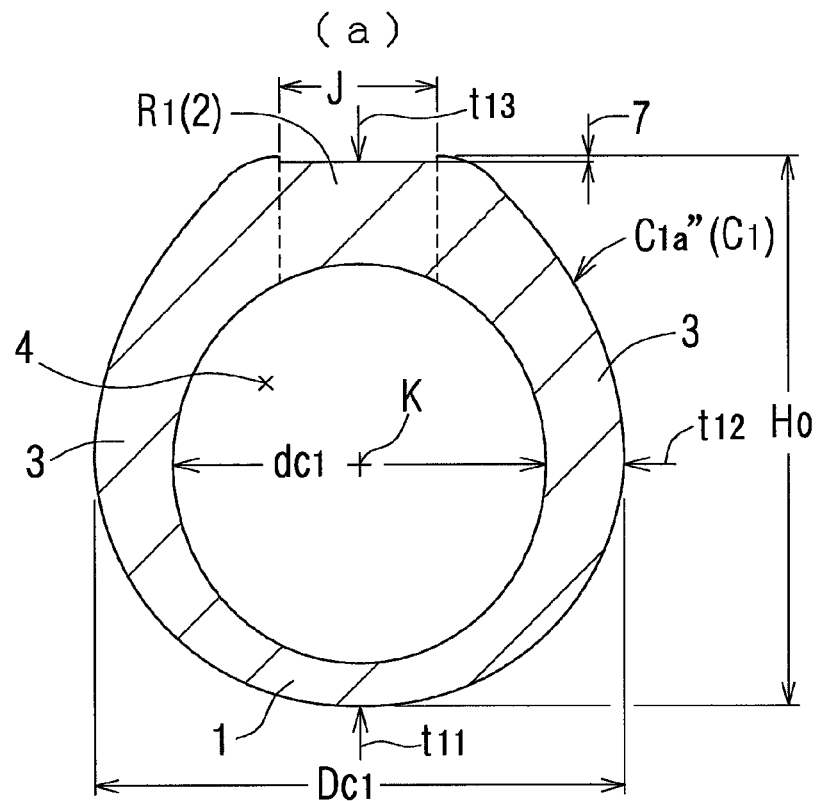
(a)
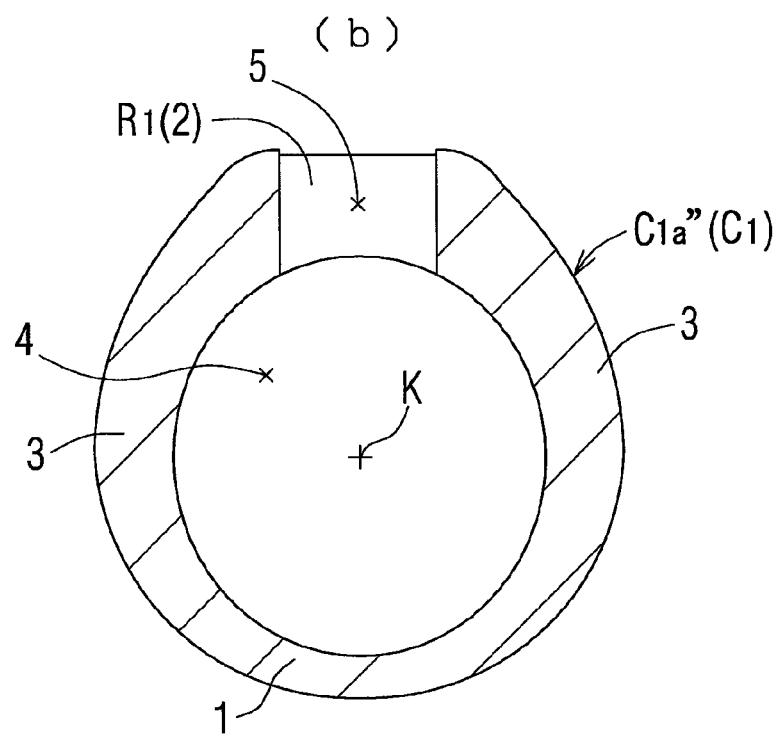
(b)

FIG. 4
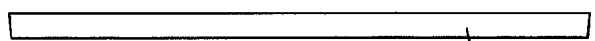
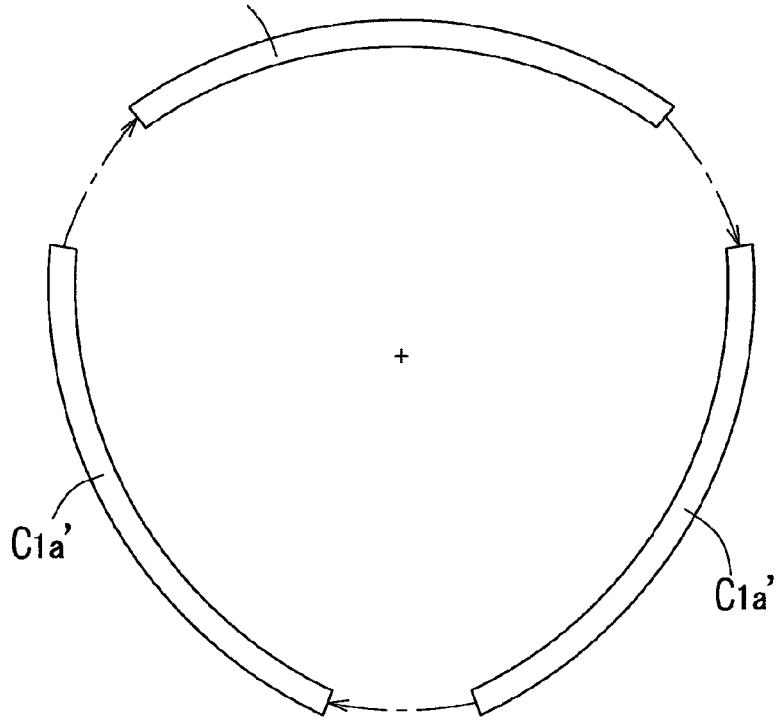
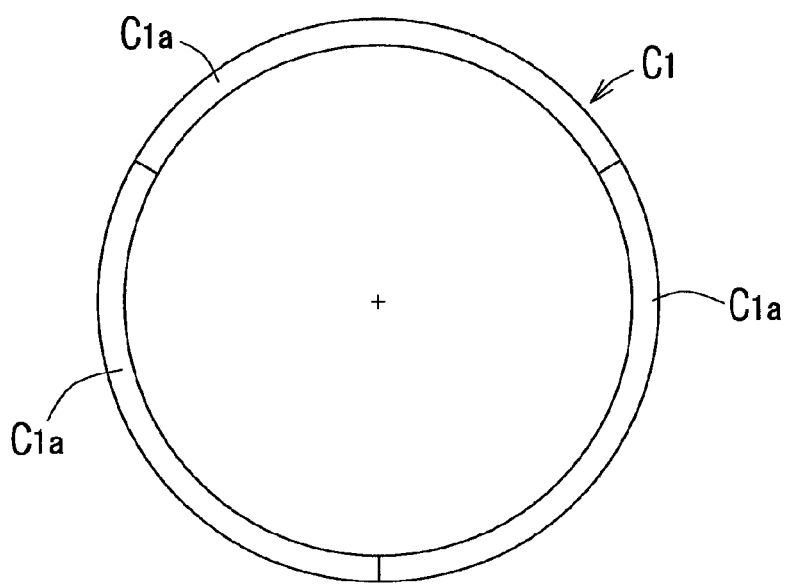

FIG. 8
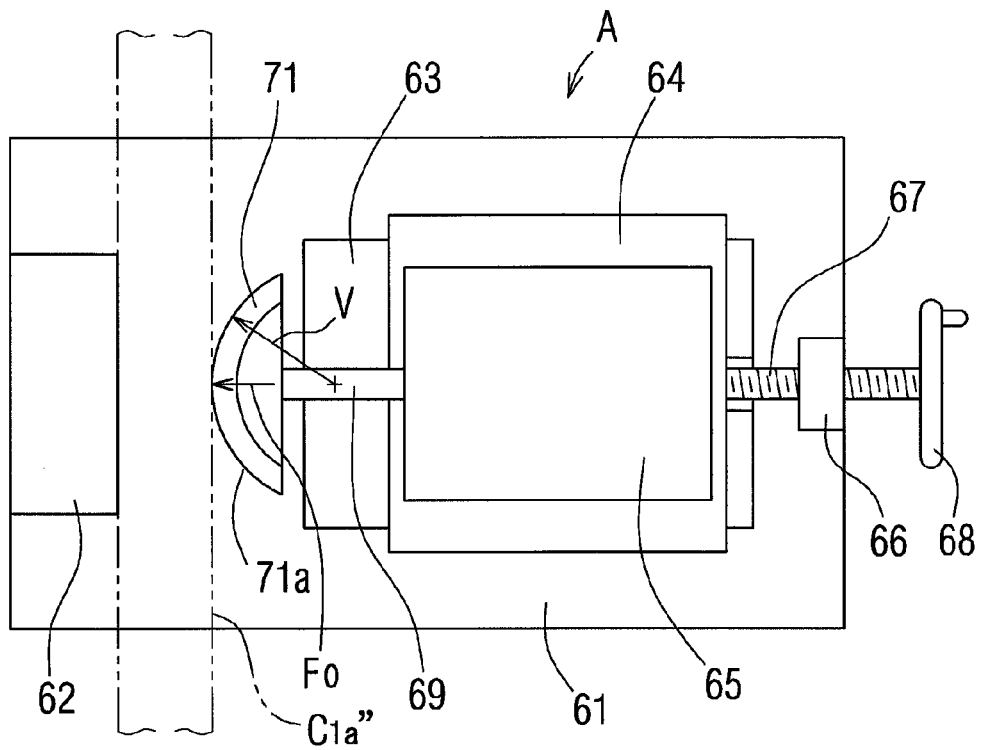
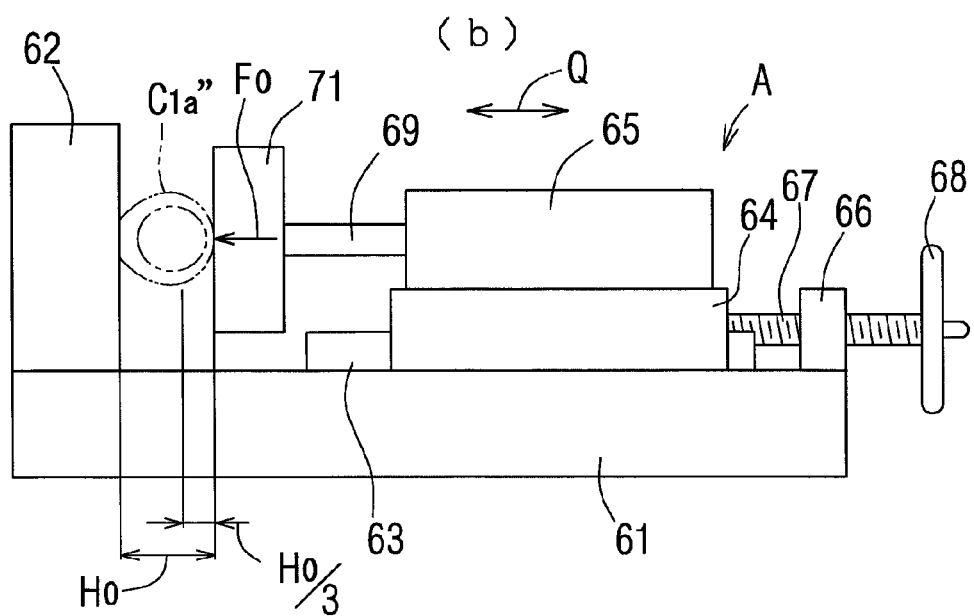

| Test conditions | |
|---|---|
| Running distance | 5,000 km |
| Load (maximum) | 50 kg |
| Surface velocity | 30 km/h |
| Height of shock bar | 5 mm |

FIG. 11

|  | Example 1-a | Example 1-b | Example 1-c | Example 1-d | Comparative Example 1-a | Comparative Example 1-b | Comparative Example 1-c |
|---|---|---|---|---|---|---|---|
| Transversal cross sectional shape | A | A | A | A | A | A | A |
| t11 (mm) | 2 | 2 | 3 | 4 | 2 | 2 | 2 |
| t12 (mm) | 3 | 3 | 3.5 | 4 | 3 | 3 | 3 |
| dc11 (mm) | 23 | 23 | 22 | 21 | 23 | 23 | 23 |
| Resin | TPEE/TPU alloy | TPEE/TPU alloy | TPEE | TPU | TPEE/TPU alloy | TPEE/TPU alloy | TPU |
| Repulsive elastic modulus (%) | 70 | 68 | 80 | 65 | 65 | 78 | 40 |
| Bending elastic modulus (MPa) | 55 | 72 | 32 | 15 | 80 | 40 | 60 |
| Tube hardness test (N) | 165 | 220 | 170 | 160 | 252 | 140 | 180 |
| Weight per one tube (g) | ○ 580 | ○ 580 | ○ 660 | △ 740 | ○ 580 | ○ 580 | ○ 580 |
| Ride quality | ○ | △ Vibration | ○ | ○ | × Large vibration | × Heavy | × Heavy |
| Durability test | △ Medium deformation | △ Small deformation | △ Medium deformation | △ Medium deformation | × Breakage of rim | × Large deformation | △ Small deformation |
| Evaluation | Acceptable | Acceptable | Acceptable | Acceptable | Rejected | Rejected | Rejected |

A : Rib-less ground part shape
TPEE : Ester elastomer
TPU : Urethane elastomer
t11 : Thickness of ground part of tube
t12 : Thickness of side part of tube dc11 : Inner diameter in transversal direction of hollow part in transversal cross section of tube ○ : Good
△ : No practical problem
× : Practical problem FIG. 14
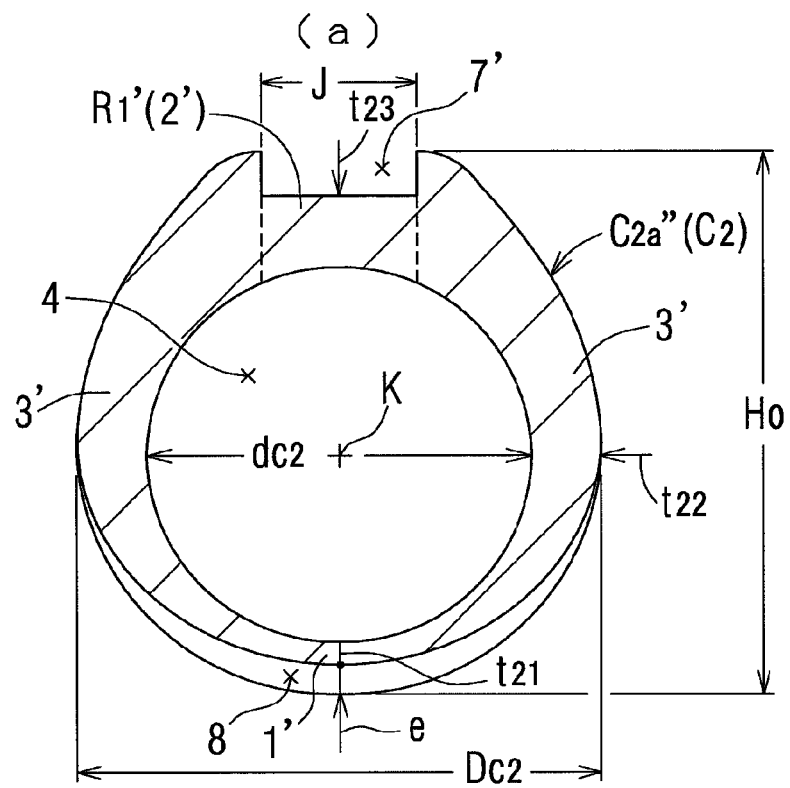
(a)
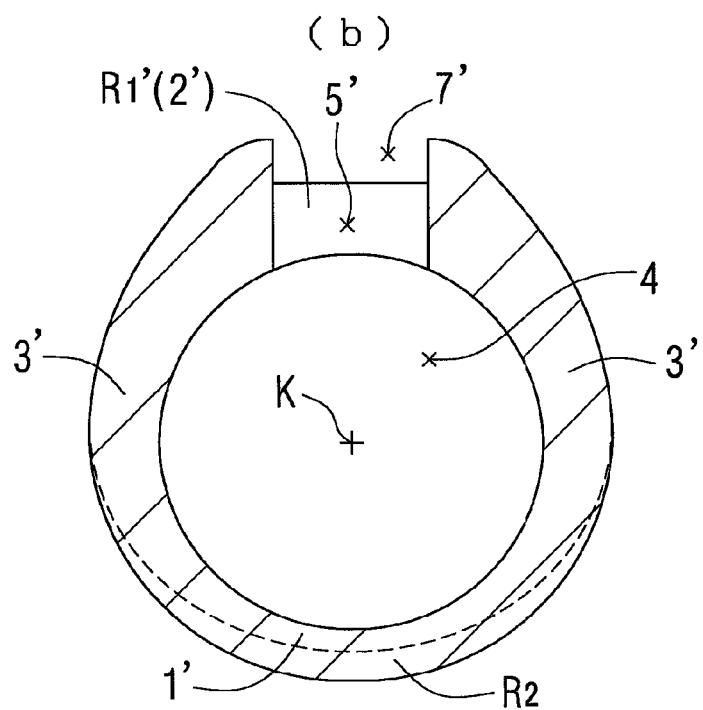
(b)

FIG. 16

|  | Example 2-a | Example 2-b | Example 2-c | Example 2-d | Comparative Example 2-a |
|---|---|---|---|---|---|
| Transversal cross sectional shape | B | B | B | B | B |
| e(mm) | 2.5 | 2.5 | 2.5 | 2.5 | 2.5 |
| t21(mm) | 1 | 1 | 1.5 | 2 | 1 |
| t22(mm) | 3.5 | 3.5 | 4 | 4.5 | 3.5 |
| dc21(mm) | 22 | 22 | 21 | 20 | 22 |
| Resin | TPEE/TPU alloy | TPEE/TPU alloy | TPEE | TPU | TPEE/TPU alloy |
| Repulsive elastic modulus (%) | 72 | 68 | 80 | 65 | 68 |
| Bending elastic modulus (MPa) | 51 | 66 | 34 | 15 | 72 |
| Tube hardness test (N) | 177 | 230 | 180 | 150 | 249 |
| Weight per one tube (g) | ○ 540 | ○ 540 | ○ 620 | △ 700 | ○ 540 |
| Ride quality | ○ | △ Vibration | ○ | ○ | × Large vibration |
| Durability test | △ Medium deformation and small wear | △ Medium deformation and small wear | △ Medium deformation and small wear | △ Medium deformation and small wear | × Breakage of rim |
| Evaluation | Acceptable | Acceptable | Acceptable | Acceptable | Rejected |

B : Ribbed ground part shape
TPEE : Ester elastomer
TPU : Urethane elastomer
e : Depth of circular arc groove
$t_{21}$ : Thickness of ground part of tube
$t_{22}$ : Thickness of side part of tube $dc_{21}$ : Inner diameter in transversal direction of hollow part in transversal cross section of tube ○ : Good
△ : No practical problem
× : Practical problem

FIG. 20

| | Material or shape of tube | Weight (26x 1 3/8 city cycle) | Pneumatic tube (150g) | Spacer (110g) | Weight increase |
|---|---|---|---|---|---|
| ① | Gel | 1300g | Necessary | Unnecessary | 1300g |
| ② | Foamed elastomer | 890g | Unnecessary | Necessary | 830g |
| ③ | Pipe | 850g | Unnecessary | Unnecessary | 680g |
| ④ | Three-dimensional net | 680g | Unnecessary | Unnecessary | 510g |

FIG. 21
(a)
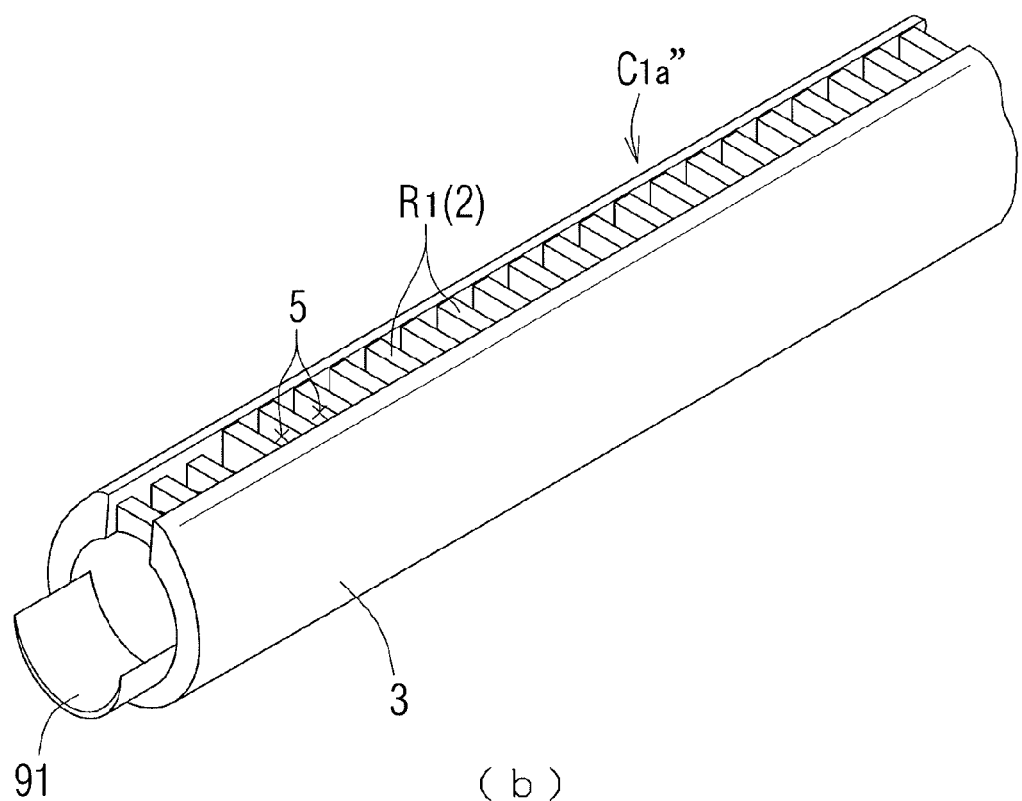
(b)
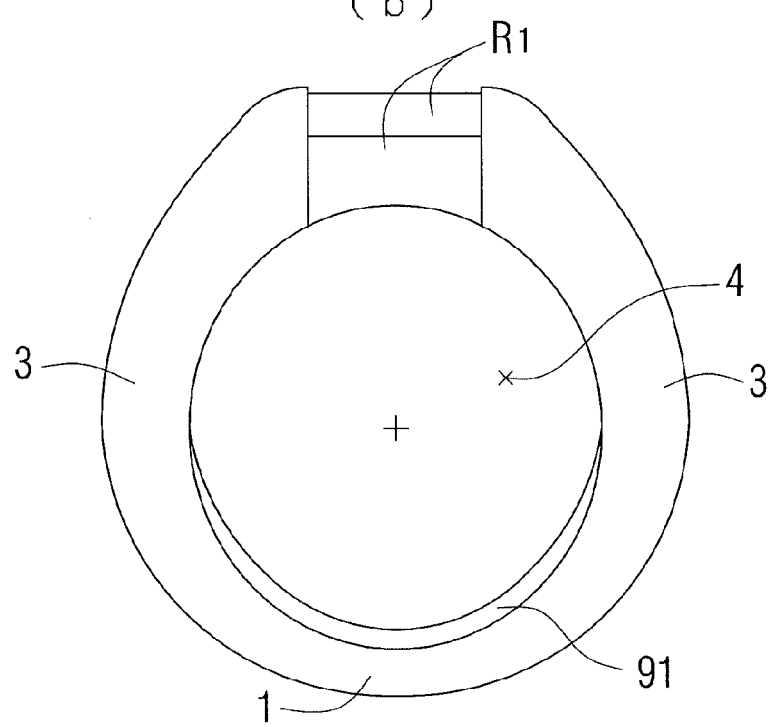

FIG. 26
(a)
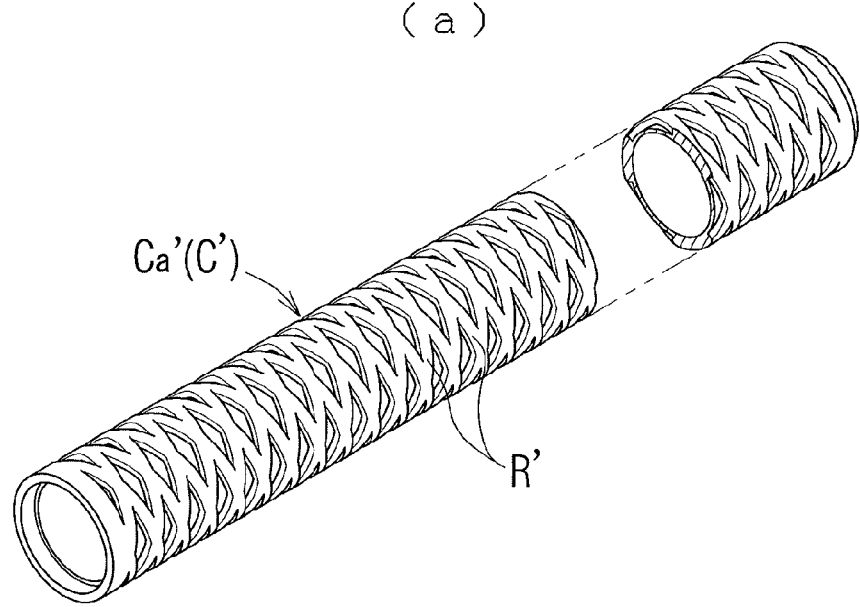
(b)
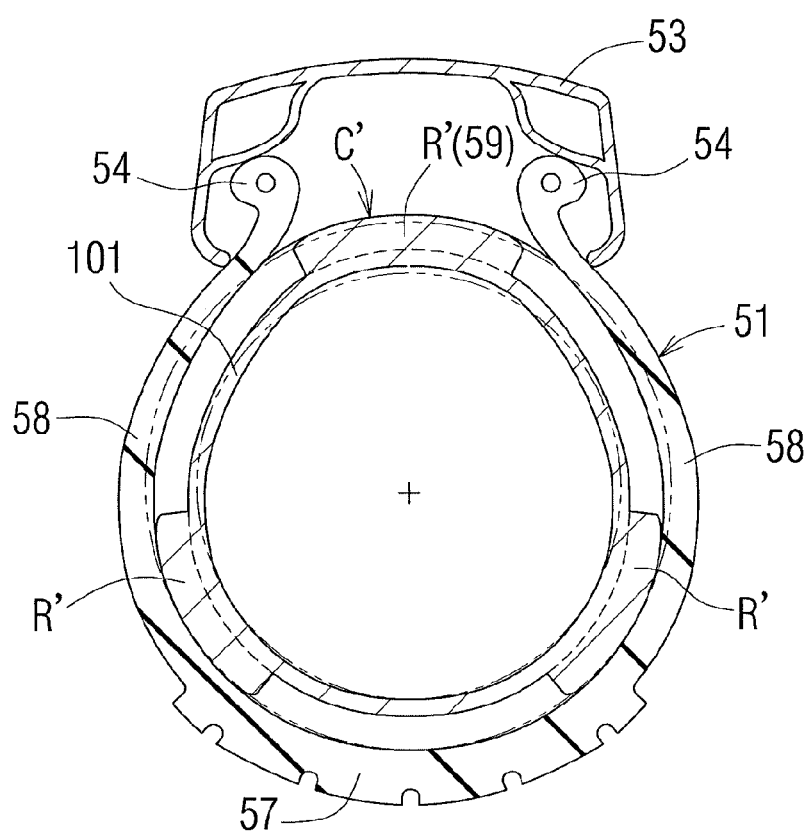

PUNCTURE-FREE INNER TUBE

BACKGROUND OF THE INVENTION

Field of the Invention

The present invention relates to a puncture-free inner tube having a hollow pipe shape that has a light weight with durability capable of preventing damages from occurring on countless contacts with an outer tire due to elastic deformation, and also has excellent ride quality.

Description of the Related Art

In the present specification, the "circumferential direction" of the tube or the divided tube means the direction along the outer contour in the transversal cross section thereof, and the "longitudinal direction" means the axial direction of the tube or the divided tube having a hollow pipe shape.

Known examples of a puncture-free inner tube, which is not punctured even though nailing, (which may be hereinafter referred simply to a "tube") include the tube described in JP-A-2005-205885. The tube described therein uses a gelled elastic material formed by injecting a heat-melted resin in a tube for a pneumatic tire, to which air is to be injected, (which may be hereinafter referred to as a "pneumatic tube"), and then solidifying the resin by cooling. The tube suffers weight increase of approximately 1,300 g for a tire with a size (26×1⅜) in addition to the pneumatic tube (weight: 170 g).

The tube described in JP-A-2010-111378 is a single rod shaped material formed of a foamed elastomer having a length corresponding to a circumferential length of a tube, and is used by inserting the material in an annular space of an outer tire constituting a tire in such a manner that both end surfaces of the material are confronted with each other. The tube requires a spacer for filling a gap between the tube and a tire rim in a state where the tube is inserted in an outer tire, and thus suffers weight increase of 830 g as compared to a pneumatic tube. The weight increase of the tube is smaller than the pneumatic tube having a gelled elastic material filled therein described above, and thus achieves weight saving.

JP-A-2010-210930 describes a tube having a hollow pipe shape formed by molding an elastomer for reducing weight increase of the tube. The present inventors have filed JP-A-2012-236588 relating to a tube formed of a three-dimensional net formed into a rod shape, in which the three-dimensional net is molded to have elastic deformability by utilizing arbitrary entanglement of large number of resin threads formed of a thermoplastic resin. Both tubes shown above are used by deforming a material having a straight shape into an annular shape and inserting the material in an outer tire. The puncture-free inner tubes using a hollow pipe and a three-dimensional net require no pneumatic tube and suffer weight increase of approximately 680 and 510 g, respectively, for a tire with a size (26×1⅜), as compared to a pneumatic tube.

FIG. 20 is a table showing comparison of the four kinds of tubes shown above for "the material or shape", "the weight", "the necessity of a pneumatic tire", "the necessity of a spacer" and "the weight increase", and for "the material or shape", the tubes are shown as "gel", "foamed elastomer", "pipe" and "three-dimensional net" in the order described above. The size of the tire, in which the tube is inserted, is (26×1⅜) for a Japanese city cycle, which is a versatile bicycle, and only for a tube of "foamed elastomer", a spacer is used for conforming the tube to the tire shape in the transversal cross section.

In the development of a puncture-free inner tube, the three elements in properties and functions of the tube, i.e., the ride quality derived from the repulsive elasticity and the bending elasticity of the material, the durability, and the light weight, are essentially demanded and achieved simultaneously. The ride quality and the durability may be achieved by devising the material and the shape of the tube, but it is considerably difficult to achieve the light weight since it may contradict to the ride quality and the durability. Even though the tubes shown above achieve the demanded levels for the ride quality and the durability, they still have a problem of failing to achieve the light weight due to the too large weight increase from a pneumatic tube. In the bicycle industry as a major user of the tubes, it is recognized that the weight increase from a pneumatic tube is approximately 500 g for satisfying the light weight standard.

The present inventor experimentally produced a puncture-free inner tube C' shown in FIG. 26A, which was reduced in weight by reinforcing a thin pipe 101 having a thickness of approximately 1 mm with a helical ribs R' in both forward and reverse directions formed over the entire outer circumferential surface of the thin pipe 101, and subjected the tube C' to a durability test. As shown in FIG. 26B, an outer tire 51 has a thickness that is gradually decreased from a ground part 57 toward a bead 54, and on acting a ground pressure thereto, both side part 58 connecting to the ground part 57 suffer the maximum deformation amount. As a result, it has been experimentally found that the tube C' achieves the light weight standard, but in the durability test, as the side parts 58 connecting to both sides of the ground part 57 suffer the maximum deformation amount corresponding to the change of the ground pressure, the repeated deformation of the side parts 58 damages the portion of the outer tire 51 over the side parts 58 to an anti-ground part 59, and when the extent of the damage becomes severe, the aforementioned portion of the outer tire 51 is broken. In FIG. 26B, numeral 53 denotes a tire rim.

SUMMARY OF THE INVENTION

An object of the invention is to provide a puncture-free inner tube that has excellent ride quality while achieving light weight and durability, by combining inherent repulsive elasticity and bending elasticity of a thermoplastic elastomer as a molding material and a total shape of the tube.

The invention provides as a first embodiment a puncture-free inner tube having a hollow pipe shape, which is to be inserted in an annular space of an outer tire having an annular shape, which is to be mounted detachably on a tire rim having an annular shape, the tube containing a thermoplastic elastomer that is molded by injection molding into a transversal cross sectional shape that is similar or substantially similar to and is slightly larger than a transversal cross section of the annular space of the outer tire, the tube having a thickness that is gradually increased from a ground part toward an anti-ground part on a side of the tire rim, the tube being formed in total into an annular shape, and the tube being to be inserted in the annular space of the outer tire in a compressed state with a tensile stress of the outer tire.

A tube inserted in an outer tire continuously receives a grounding force on using, and after using the tube for a prolonged period of time, such a phenomenon may occur that the original shape of the tube is not restored even when the grounding force is removed (i.e., a creep phenomenon), and the tube may gradually be flattened to deteriorate the ride quality. According to the first embodiment of the invention, the thickness of the tube is gradually increased from the ground part toward the anti-ground part on the side of the tire rim, and thereby the side wall strength, which is the strength preventing the side parts of the tube from being deformed, is increased, i.e., the deformation of the side parts of the tube is decreased, and the strength maintaining the total shape of the tube is increased, so as to ensure good ride quality for a prolonged period of time. On the other hand, the ground part and the parts on both sides of the ground part of the tube are relatively thin as compared to the other parts, and thus have rich elastic deformability on application of the grounding force while maintaining the total shape of the tube, and thereby the ride quality is enhanced for a prolonged period of time.

The tube according to the first embodiment of the invention is formed by molding, by injection molding, a thermoplastic elastomer into the hollow pipe shape having a transversal cross sectional shape that is similar or substantially similar to and is slightly larger than the transversal cross section of the annular space of the outer tire. The tube is inserted in the outer tire in such a state that the tube is deformed in total into an annular shape, and is slightly deformed in the transversal cross section, and the end surfaces of the tube are confronted with each other due to the force pushing them each other, as if the tube formed into an annular shape has no connection. Hence, in the state where the tube is inserted in the outer tire, the outer surface of the tube except for the part facing the tire rim is closely in contact with the inner surface of the outer tire, and the tube undergoes elastic deformation with the tire integrated therewith. The tube has a hollow structure formed of a thermoplastic elastomer molded into a hollow pipe shape, and thus both the lightweight and the repulsive elasticity, which are necessary for the inner tube, are achieved to provide good ride quality.

The both side parts continuing from the ground part of the tube suffer the maximum deformation amount and are rubbed with the inner surface of the outer tire on using, but these parts are formed to have a curved surface without irregularity and thus suffer substantially no damage even when rubbed with the inner surface of the outer tire. Consequently, the durability of the side parts of the tube is ensured.

The invention provides as a second embodiment the puncture-free inner tube according to the first embodiment, wherein the tube has, in the anti-ground part on the inner circumferential side thereof facing the tire rim, a continuous opening along a longitudinal direction of the tube having therein ribs extending in the circumferential direction that are formed along the longitudinal direction with a constant pitch, thereby forming a partially open structure.

According to the second embodiment of the invention, since the anti-ground part on the inner circumferential side of the tube facing the tire rim is not in contact with the inner surface of the outer tire, the ribs are formed in the anti-ground part to form a partially open structure, by which the tube may be reduced in weight. The ribs are formed on the inner circumferential side of the tube, and therefore on bending the tube or the divided tube in a single pipe form into an annular shape or a circular arc shape by annealing after molding, the compression strain formed on the inner circumferential side may be easily relieved. Thus, the tube after bending undergoes substantially no change in the cross sectional shape thereof, and the bending operation thereof may be facilitated. Furthermore, the part having the ribs is not in contact with the outer tire, and therefore the ribs provided do not damage the outer tire.

The invention provides as a third embodiment the puncture-free inner tube according to the first or second embodiment, wherein the tube contains plural divided tubes that are divided into plural portions in a longitudinal direction thereof and are connected to each other at end parts thereof to form an annular shape, and the end parts in the longitudinal direction of the divided tubes are connected to each other through a connecting unit into an annular shape in total.

According to the third embodiment of the invention, the tube is constituted by the plural divided tubes, and thereby an advantage on molding may be provided in the case where there is a restriction in injection molding. The divided tube is necessarily formed to have a circular arc shape corresponding to the diameter of the tire such that it can be inserted in the tire, and the method of forming the circular arc shape may include the case where the divided tube as a molded article molded in a straight shape is deformed by annealing as a secondary processing, and the case where the divided tube is injection-molded to have a circular arc shape corresponding to the diameter of the center of the annular space of the outer tire. The plural divided tubes to be inserted in the annular space of the outer tire may be connected with a connecting part, such as a connecting member, and thereby on inserting the divided tubes in the annular space, the two divided tubes to be connected may be prevented from being deviated in circumferential phase (i.e., the two divided tubes to be connected may be prevented from being rotated relatively in the circumferential direction).

The invention provides as a fourth embodiment the puncture-free inner tube according to any one of the first to third embodiments, wherein the tube in a single pipe form or plural divided tubes to be connected into an annular shape have end surfaces that each are tilted at a prescribed angle in the longitudinal direction for preventing the end surfaces from interfering with each other.

In the case where the end surfaces of the tube or the divided tube are perpendicular to the longitudinal direction thereof, the end surfaces may interfere with each other on connecting the end parts of the tube in a single pipe form or connecting the end parts of the divided tubes adjacent to each other to form an annular shape, due to the difference in circumferential length between the inner circumferential side and the outer circumferential side (i.e., the difference in length along the annular shape). According to the fourth embodiment of the invention, however, the end surfaces of the single tube or the divided tube are tilted in the longitudinal direction, and thus the end surfaces of the tube or the divided tubes to be connected in an annular shape may be prevented from interfering with each other, thereby connecting the tube or the divided tubes into an annular shape without problems.

The invention provides as a fifth embodiment the puncture-free inner tube according to the third embodiment, wherein the connecting unit is a separately provided connecting member, the connecting member has plural engagement protrusions in a form of a shelf, and the engagement protrusions each engage with a gap between the ribs.

According to the fifth embodiment of the invention, the engagement protrusions of the connecting member are engaged with the gaps among the ribs formed on the inner circumferential side of the tube, and thereby the end parts of the two divided tubes may be connected to each other, or the both end parts of the tube in a single pipe form in an annular shape may be connected to each other, with the connecting member.

The invention provides as a sixth embodiment the puncture-free inner tube according to the third embodiment, wherein the divided tubes to be connected each have integrated therewith a connecting piece that is protruding at a part of one of the end parts in the longitudinal direction thereof on a side of the anti-ground part, and the connecting unit contains a connecting hole that is formed in the connecting piece and a connecting protrusion that is formed in the divided tubes at a part of the other of the end parts in the longitudinal direction thereof on a side of the anti-ground part and is to engage with the connecting hole.

According to the sixth embodiment of the invention, the divided tubes may be connected to each other, without the use of a separately provided connecting member, by using the connecting piece provided in the divided tubes as a protrusion extending in the longitudinal direction at the part of one of the end parts in the longitudinal direction thereof on the side of the anti-ground part, and allowing the connecting hole provided in the connecting piece to be engaged with the connecting protrusion that is formed in the divided tubes at the part of the other of the end parts in the longitudinal direction thereof on the side of the anti-ground part.

The invention provides as a seventh embodiment the puncture-free inner tube according to any one of the third to sixth embodiments, wherein the divided tubes to be connected each have integrated therewith as a protrusion extending in the longitudinal direction thereof a deformation preventing piece at one of the end parts in the longitudinal direction thereof on an inner circumferential surface on the ground part, and the deformation preventing piece engages with an inner circumferential surface of the other divided tube to be connected, thereby preventing the end parts of the divided tubes connected to each other from being deformed in a transversal cross section on using.

The end parts in the longitudinal direction of the divided tube are unrestricted in shape as compared to the other portions thereof, and are liable to be deformed on application of an external force. According to the seventh embodiment of the invention, the divided tubes to be connected each have integrated therewith as a protrusion extending in the longitudinal direction thereof a deformation preventing piece at one of the end parts in the longitudinal direction thereof on the inner circumferential surface on the ground part, and the deformation preventing piece is engaged with an inner circumferential surface of the other divided tube to be connected. Accordingly, in the state where the divided tubes are connected to each other, the part on the ground part of the connecting part of the divided tube is reinforced with the deformation preventing piece, and thus may be prevented or suppressed from being deformed in the transversal cross section. As a result, the integrated connectivity of the divided tubes may be improved, which contributes to the enhancement of the ride quality. In particular, the part on the ground part of the end parts of the divided tube is in contact with the ground through the tire and has a small thickness as compared to the anti-ground part, and thus a large effect of preventing or suppressing deformation may be obtained with the deformation preventing piece.

The invention provides as an eighth embodiment the puncture-free inner tube according to any one of the first to seventh embodiments, wherein when hardness of the tube in a single pipe form or the divided tube is determined based on a particular external force that reduces a height dimension of the tube or the divided tube by ⅓ on applying the external force to the tube or the divided tube, which is prevented from moving, in a direction perpendicular to the longitudinal direction or the bending direction of the tube or the divided tube, the particular external force is from 150 to 400 N.

According to the eighth embodiment of the invention, the hardness of the tube may be evaluated by measuring the particular external force. When the particular external force is less than 150 N, the tube may be too soft, whereas when the particular external force is more than 400 N, the tube may be too hard, and in both cases, the tube may not be subjected to practical use.

According to the first embodiment of the invention, the thickness of the tube is gradually increased from the ground part toward the anti-ground part on the side of the tire rim, and thereby the side wall strength, which is the strength preventing the side parts of the tube from being deformed, is increased, i.e., the deformation of the side parts of the tube is decreased, but the strength maintaining the total shape of the tube is increased, so as to ensure good ride quality for a prolonged period of time.

According to the second embodiment of the invention, the ribs are formed on the inner circumferential side of the tube, and thereby the tube is further reduced in weight. Furthermore, the compression strain or the tensile strain that is formed on the inner circumferential side or the outer circumferential side of the tube on bending the tube in a single pipe form into an annular shape or bending the divided tube into a circular arc shape may be relieved. Thus, the tube after bending undergoes substantially no change in the transversal cross sectional shape thereof, and the bending operation thereof may be facilitated.

BRIEF DESCRIPTION OF THE DRAWINGS

FIGS. 3A and 3B are enlarged cross sectional views on line $X_1$-$X_1$ and line $X_2$-$X_2$ in FIG. 2, respectively.

FIGS. 4A, 4B and 4C are illustrations showing a process of forming a tube $C_1$ by connecting three divided tubes $C_{1a}"$ into an annular shape.

FIGS. 8A and 8B are a plan view and a side elevational view, respectively, of a hardness tester A for a tube.

FIG. 11 is a table showing Examples 1-a to 1-d and Comparative Examples 1-a to 1-c of a tube $C_1$ having a shape according to Example 1.

FIGS. 14A and 14B are enlarged cross sectional views on line $Y_1$-$Y_1$ and line $Y_2$-$Y_2$ in FIG. 13, respectively.

FIG. 16 is a table showing Examples 2-a to 2-d and Comparative Example 2-a of a tube $C_2$ having a shape according to Example 2.

FIG. 20 is a table showing comparison in weight increase between ordinary tubes and a pneumatic tube.

FIGS. 21A and 21B are a perspective view and a side view, respectively, of a divided tube $C_{1a}"$ having integrated therewith a deformation preventing piece 91.

FIG. 26A is a perspective view of a divided tube $C_a'$ showing an ordinary tube C', which is experimentally produced by the present inventors, and FIG. 26B is a cross sectional view showing a tire T having the tube C' inserted therein.

DESCRIPTION OF THE PREFERRED EMBODIMENTS

The invention will be described in more detail with reference to plural examples below.

Example 1

Figure 1:
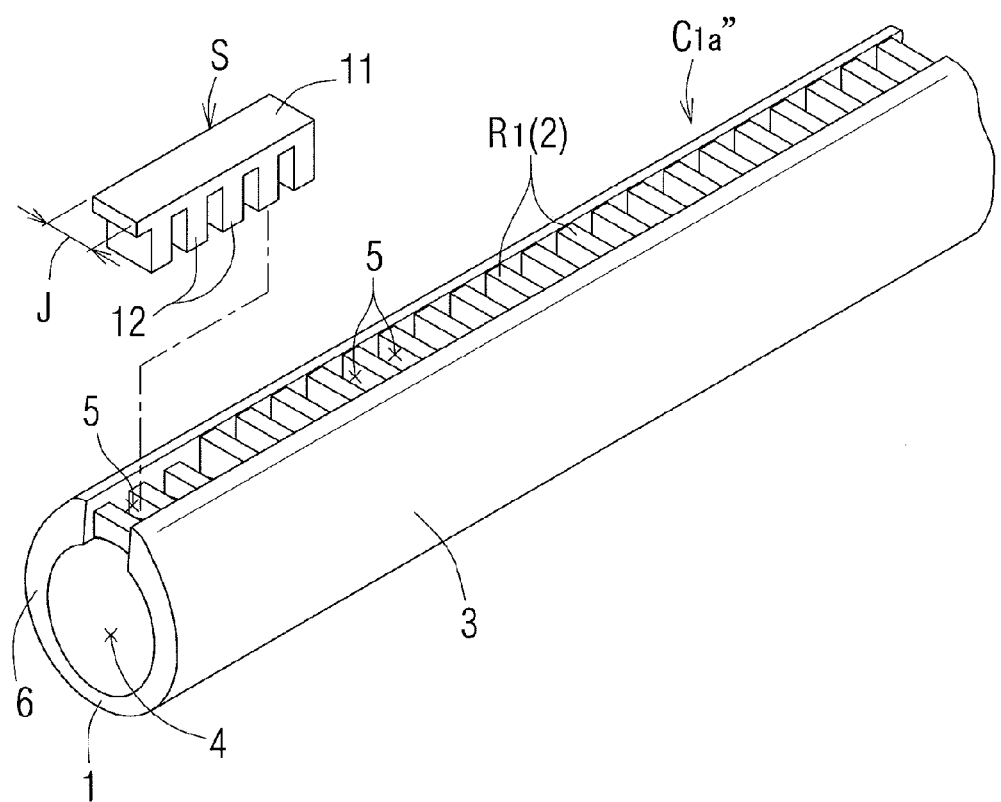
FIG. 1 is a perspective view showing a divided tube $C_{1a}"$ and a connecting member S constituting a tube $C_1$.
Figure 2:
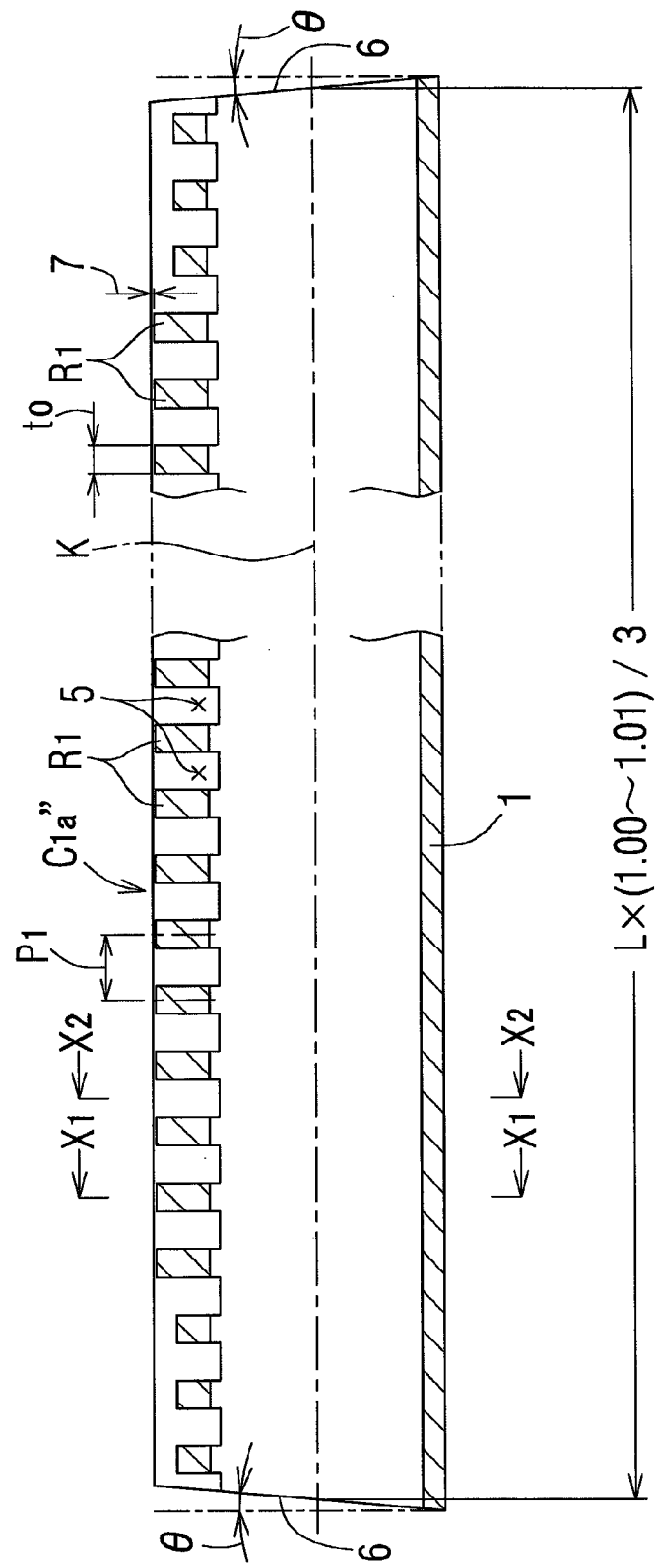
FIG. 2 is a cross sectional view of the divided tube $C_{1a}"$ in the longitudinal direction thereof (longitudinal cross sectional view).
Figure 6:
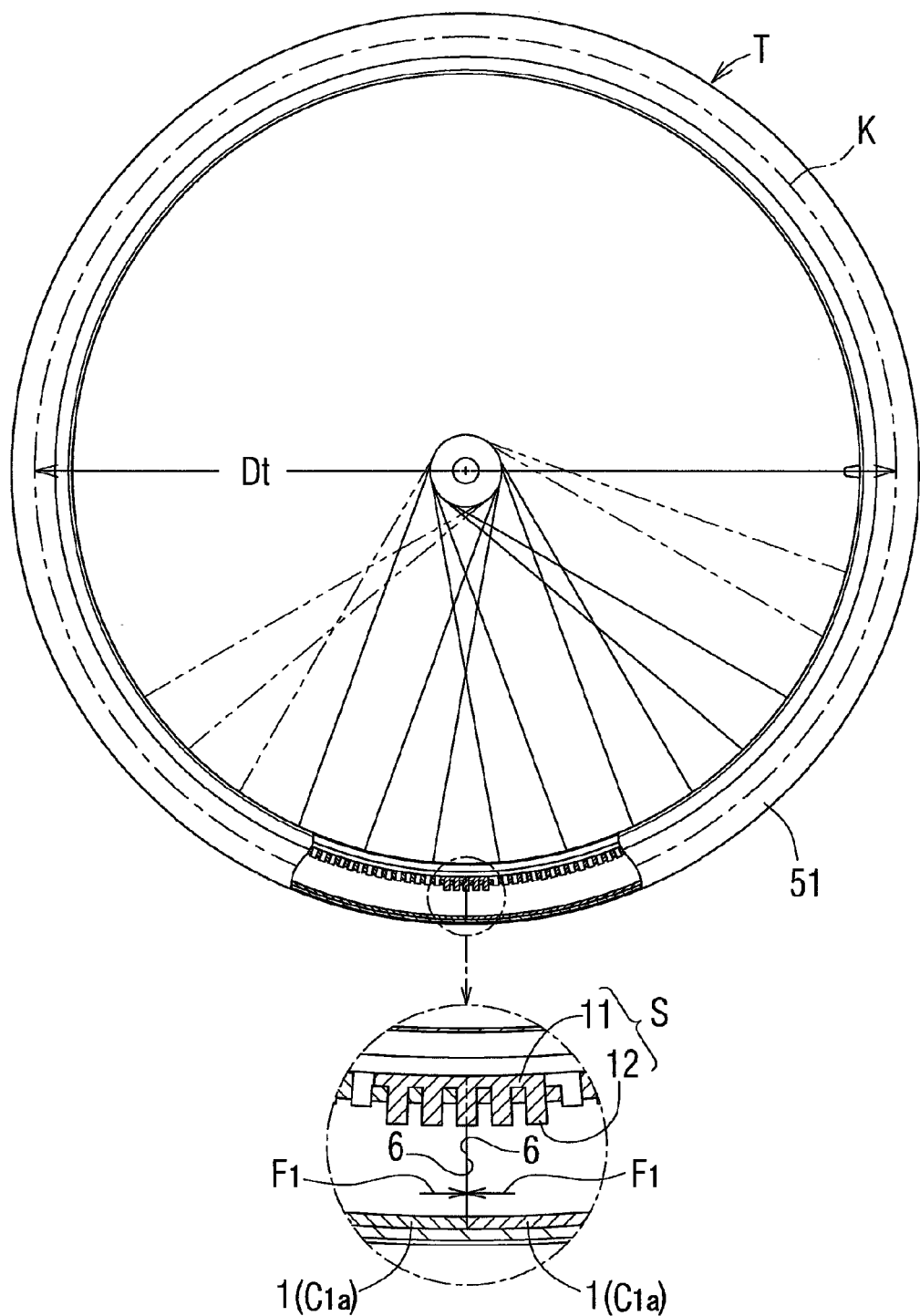
FIG. 6 is a partially broken away front elevational view of a tire T having a tube $C_1$ inserted in an annular space 52 of an outer tire 51.
Figure 7:
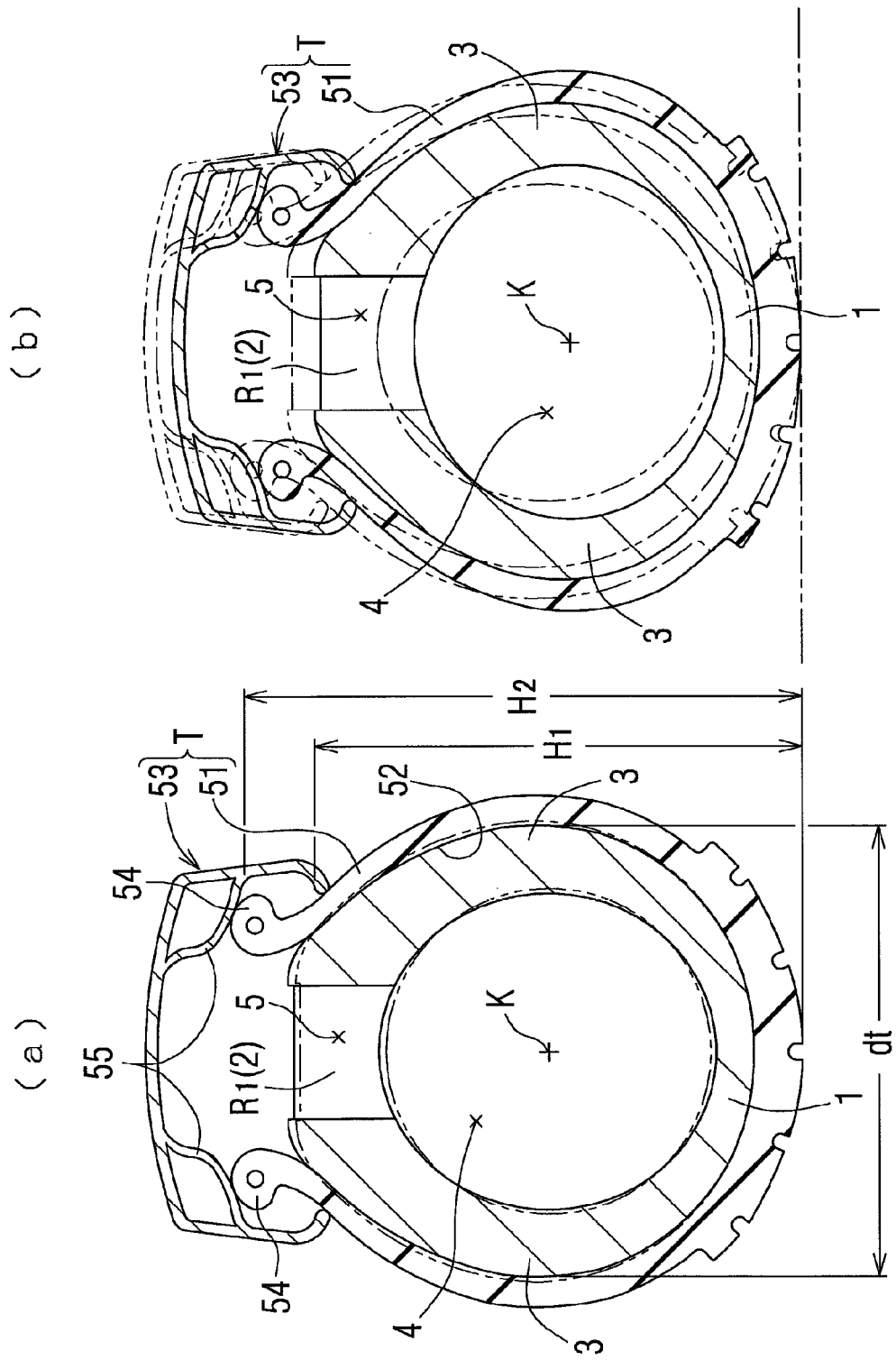
FIG. 7A is a transversal cross sectional view of a tire T having a tube $C_1$ inserted therein in a non-grounded state.
FIG. 7B is a transversal cross sectional view of the tire T, to which a ground pressure is applied.

The invention will be described in more detail with reference to a specific example. A tube $C_1$ according to the first embodiment of the invention will be described with reference to FIGS. 1 to 6. The tube $C_1$ is constituted by three divided tubes $C_{1a}"$ in a straight shape, and on inserting them in a tire T of a bicycle, the three divided tubes $C_{1a}"$ in a straight shape are each bent into a circular arc shape corresponding to the diameter Dt of the tire T (i.e., the diameter of the part K, which is the center of the transversal cross section of an outer tire 51 shown in FIG. 6), and are connected to each other at end parts in the longitudinal direction thereof with a connecting members S, thereby forming into the tube $C_1$ having an annular shape in total. The divided tube $C_{1a}"$ in a straight shape has an irregular cylindrical shape having a hollow part 4 having a circular cross section having an inner diameter $dc_1$ as shown in FIGS. 1 to 3, in which in the state where the divided tubes $C_{1a}"$ are formed into the tube $C_1$, the divided tube $C_{1a}"$ has a thickness that is gradually increased in the circumferential direction from a ground part 1 on the outer circumferential side toward an anti-ground part 2 on the inner circumferential side facing the ground part 1, and thus the thickness $t_{12}$ of side parts 3 is larger than the thickness $t_{11}$ of the ground part 1 and is smaller than the thickness $t_{13}$ of the anti-ground part 2. The inner circumferential surface of the anti-ground part 2 is formed into a circular arc shape, but the outer circumferential surface thereof has a flat part that is formed partly in the circumferential direction and is slightly depressed from the adjacent parts in the circumferential direction to facilitate engagement with a connecting member S described later. As shown in FIGS. 7A and 7B, the anti-ground part 2 of the tube $C_1$ having first ribs $R_1$ is disposed to face a tire rim 53 and is not in close contact with the inner surface of the outer tire 51, and the outer circumferential surface of the tube $C_1$ that is in close contact with the inner surface of the outer tire 51, particularly the outer circumferential surface of the side parts 3 of the tube $C_1$, is formed as a smooth curved surface having completely no irregularity. As shown in Examples 1-a to 1-d described later, in a Japanese city cycle with a size (26×1⅜), the inner diameter $dc_1$ in the transversal direction of the hollow part 4 of the tube $C_1$ is approximately 20 mm, the thickness $t_{11}$ of the ground part 1 thereof is from 2 to 3 mm, and the thickness $t_{12}$ of the side parts thereof is from 3 to 5 mm.

The thickness of the divided tube $C_{1a}"$ in the transversal cross section is varied among the parts thereof due to the following reasons. The divided tube $C_{1a}"$ in a straight shape is molded with a thermoplastic elastomer (TPE) and has repulsive elasticity. In the case where the tube $C_1$, which is formed of three divided tubes $C_{1a}"$ deformed into a circular arc shape connected to each other, is inserted to the annular space 52 of the outer tire 51, which are thus used as the tire T, a creep phenomenon may occur, in which in the use for a prolonged period of time, even when the grounding force is removed from the tube $C_1$, the tube $C_1$ fails to retrieve the original shape. Accordingly, the tube $C_1$ is gradually flattened, and the ride quality is deteriorated due to the reduction of the repulsive elasticity. For avoiding the phenomenon, the thickness of the tube $C_1$ in the cross section is gradually increased from the ground part 1 toward the anti-ground part 2 as shown above, and the thickness of the side parts 3 is made larger than the thickness of the ground part 1, thereby increasing the side wall strength, which is the strength preventing the total shape, particularly the side parts, of the tube from being deformed. The cross sectional shape of the tube $C_1$ herein may be referred to as a "rib-less ground part shape".

The diameter on the center K of the tire T is Dt, and thus the circumferential length L on the center K of the tire T is (L=π×Dt). The length on the center (axial center) of the divided tube $C_{1a}"$, three of which constitute the tube $C_1$ (the axial center of the divided tube $C_{1a}"$ is assumed to be the same as the center K of the annular space 52 of the tire T in a non-ground state), may be (L×(1.00 to 1.01)/3) for preventing a gap from occurring at the connecting part and for enabling the insertion operation. The number of divided tubes forming the tube may be determined relatively with the length that can be provided by injection molding, and the number of the divided tubes may be decreased for a tire having a smaller diameter, such as a tire for an infant bicycle. The tube finally inserted in the annular space 52 of the outer tire 51 is stabilized in structure with a smaller number of connecting parts, and thus a tube in a single pipe form having no divided structure is most preferred when such a tube can be molded.

In the tube $C_1$ inserted in the annular space 52 of the outer tire 51, only the anti-ground part 2 facing the tire rim 53 is left open without close contact with the inner surface of the outer tire 51, but all the remaining parts are made in close contact with the inner surface of the outer tire 51, and thereby the tube $C_1$ necessarily undergoes elastic deformation with the outer tire 51 integrated therewith on using. Accordingly, as in the transversal cross sections shown in FIG. 3A and FIG. 7A, the inner diameter dt of the outer tire 51 in the transversal direction of the part passing through the center K of the tire T in the annular space 52 (see FIG. 7A) and the outer diameter $D_{C1}$ of the divided tube $C_{1a}"$ passing through the center K (see FIG. 3A) necessarily have the relationship $D_{C1}=((1.01 \text{ to } 1.10)\times dt)$, and in the state where the tube $C_1$ is inserted in the annular space 52 of the outer tire 51, the outer tire 51 is stretched to elongate slightly the circumferential length in the transversal cross section thereof, so as to generate a tensile force in all directions, mainly in the circumferential direction and the longitudinal direction of inside of the outer tire 51 (annular direction). In this state where the tube $C_1$ is inserted in the annular space 52 of the outer tire 51, the tube $C_1$ is elastically deformed in such a manner that the tube $C_1$ is slightly compressed in the transversal direction in the transversal cross section thereof while maintaining the length thereof in the longitudinal direction (annular direction), and is slightly stretched in the vertical direction (i.e., the radial direction of the tire T). As a result, as shown in FIG. 6, the end surfaces 6 of the divided tube $C_{1a}$ in a circular arc shape inserted in the annular space 52 of the outer tire 51 are maintained in the state where they are confronted with each other with the tensile force in the longitudinal direction (annular direction) generated inside the outer tire 51, and thus the three divided tubes $C_{1a}$ are in the state as if the divided tubes are connected and integrated with each other in the annular space 52 of the outer tire 51.

In FIGS. 3A and 7A, the height dimension $H_0$ of the divided tube $C_{1a}"$ or the tube $C_1$ in the transversal cross section thereof (see FIG. 3A) is in a range of $(H_2 > H_0 > H_1)$, wherein in the state where the beads 54 of the outer tire 51 having the tube $C_1$ inserted therein is mounted on the tire rim 53, the height of the outer tire 51 from the ground part to the outer edge of the tire rim 53 is $H_1$, and the height thereof from the ground part to the inner wall 55 of the tire rim 53 is $H_2$ (see FIG. 7A).

The anti-ground part 2 of the divided tube $C_{1a}"$ has the maximum thickness and has a large number of first ribs $R_1$ extending in the circumferential direction that are formed along the longitudinal direction with a constant pitch $P_1$, and hollow gaps 5 are formed between the first ribs $R_1$ adjacent to each other. The first ribs $R_1$ are each formed in the form of a plate, and the shape of the first ribs $R_1$ on the outer side is formed flat with a recessed part 7 having a small step formed with respect to the total outer circumferential surface of the tube $C_1$ (see FIGS. 2 and 3A). The pitch $P_1$ of the first ribs $R_1$ is 8 mm, and the length J along the circumferential direction (see FIG. 3A) and the thickness $t_0$ (see FIG. 2) thereof are 10 mm and 3 mm, respectively. The structure having a large number of first ribs $R_1$ formed in the anti-ground part 2 with a large thickness on the inner circumferential side of the tube $C_1$ with the hollow gaps 5 formed between the first ribs $R_1$ adjacent to each other is provided mainly due to the following two reasons. The first reason is that the tube $C_1$ is reduced in weight by providing the hollow gaps 5, and the second reason is that the first ribs $R_1$ are on the inner circumferential side on bending the divided tube $C_{1a}"$ to a circular arc shape, and thus the compression strain on the inner circumferential side is relieved therewith, thereby facilitating the bending operation.

The three divided tubes $C_{1a}"$ in a straight shape are secondarily processed to divided tubes $C_{1a}'$ that are bent to a circular arc shape corresponding to the diameter Dt of the tire T, and are then connected to each other with connecting members S to form a tube $C_1$, which is then inserted in the annular space 52 of the outer tire 51. Accordingly, the end surfaces 6 of the divided tubes $C_{1a}"$ in a straight shape may be tilted at a prescribed angle θ in the longitudinal direction, and thereby the end surfaces are prevented from interfering with each other on bending to a circular arc shape and connecting the divided tubes. The angle θ may be approximately 5° for a Japanese city cycle with a size (26×1⅜) which is a versatile bicycle.

The divided tubes $C_{1a}"$ is molded by injection molding with a thermoplastic elastomer (TPE), such as a styrene series (SBC), an olefin series (TPO), a urethane series (TPU), an ester series (TPEE) or an amide series (TPAE), as a raw material resin. Examples of the thermoplastic elastomer (TPE) that is suitable for providing the repulsive elastic modulus and the bending elastic modulus as the necessary properties of the tube include an ester series elastomer (TPEE), a urethane series elastomer (TPU) and a polymer alloy of these elastomers. The injection molding die used may include a pair of divided molds for forming the outer shape of the divided tube $C_{1a}"$ and a sliding mold in a rod shape for forming the hollow part 4 of the divided tube $C_{1a}"$ by inserting into the center of the hollow cylindrical cavity formed with the pair of divided molds. In the case where the division number of the tube (i.e., the number of the divided tubes) is large or in the case where the tube has a small outer diameter, for example, a tube for an infant bicycle, the divided tube may be injection-molded into a circular arc shape as the final shape. In this case, the sliding mold in a rod shape to be inserted into the center of the hollow curved cylindrical cavity formed with the pair of divided molds having a circular arc shape as its total shape may be formed to have the same circular arc shape as the circular arc shape of the divided tube to be molded, and after molding, the slide mold may be withdrawn from the molded article by rotating the mold around the center of the circular arc shape, thereby completing the molding. The secondary molding of the divided tube described later may be omitted by molding the divided tube to have the circular arc shape as the final shape in the injection molding.

As for the elastic properties of the thermoplastic elastomer as the material of the tube, the bending elastic modulus thereof may be necessarily in a range of from 15 to 1,700 MPa, and the repulsive elastic modulus thereof may be necessarily more than 45%.

When the bending elastic modulus of the thermoplastic elastomer as the material of the tube exceeds 1,700 MPa, the bending deformability of the material may be significantly reduced to make the material too hard and brittle, and the durability may be deteriorated. When the bending elastic modulus thereof is less than 15 MPa, the material may be too soft to increase the ground contact resistance, and thus large power may be required on riding a bicycle or the like, which may not be suitable for practical use. Actually, the bending elastic modulus of the thermoplastic elastomer as the material of the tube is preferably from 15 to 1,000 MPa. When the repulsive elastic modulus of the thermoplastic elastomer is 45% or less, comfortable bounce required for a tire may be reduced to increase the ground contact resistance, and thus large power may be required on riding a bicycle or the like. Actually, the repulsive elastic modulus of the thermoplastic elastomer as the material of the tube is preferably 50% or more.

The three divided tubes $C_{1a}''$ thus injection-molded to a straight shape are then subjected to the following secondary molding for connecting them into an annular shape to form the tube $C_1$. Specifically, as shown in FIGS. 4A to 4C, the divided tube $C_{1a}''$ is mounted in a bent form on a dedicated annealing jig (which is not shown in the figure) along a curved template surface thereof, and then placed in a thermostat chamber at a temperature maintained to approximately 80° C. for approximately 20 hours while maintaining the mounted state, and thereby the divided tube $C_{1a}''$ in a straight shape is annealed and bent along the curved template surface of the annealing jig. The divided tube $C_{1a}'$, which is the divided tube $C_{1a}''$ in a straight shape having been bent by annealing into the intermediate form, has a curvature radius that is larger than the curvature radius of the divided tube $C_{1a}$ as a part of the connected tube $C_1$, and therefore the three divided tubes $C_{1a}'$ are further bent on inserting them in the annular space 52 of the outer tire 51. FIG. 4C shows the state where the three divided tubes $C_{1a}'$ are inserted in the annular space 52 of the outer tire 51, and the divided tubes are in a near triangular form before inserting in the annular space 52. In the case where the connecting member S is used, when the base plate 11 of the connecting member S protrudes from the surface on the inner circumferential side of the divided tube $C_{1a}'$ (i.e., from the surface where the first ribs $R_1$ are provided), the connecting member S may interfere with the tire rim 53 on inserting the divided tube $C_{1a}'$ in the outer tire 51, and therefore the height of the several number of the first ribs $R_1$ from the end surface 6 of the divided tube $C_{1a}''$ is made lower than the other first ribs $R_1$, and thereby the outer surface of the base plate 11 of the connecting member S conforms to the surface on the inner circumferential side of the divided tube $C_{1a}'$ (see FIGS. 1, 2 and 5).

Figure 5:
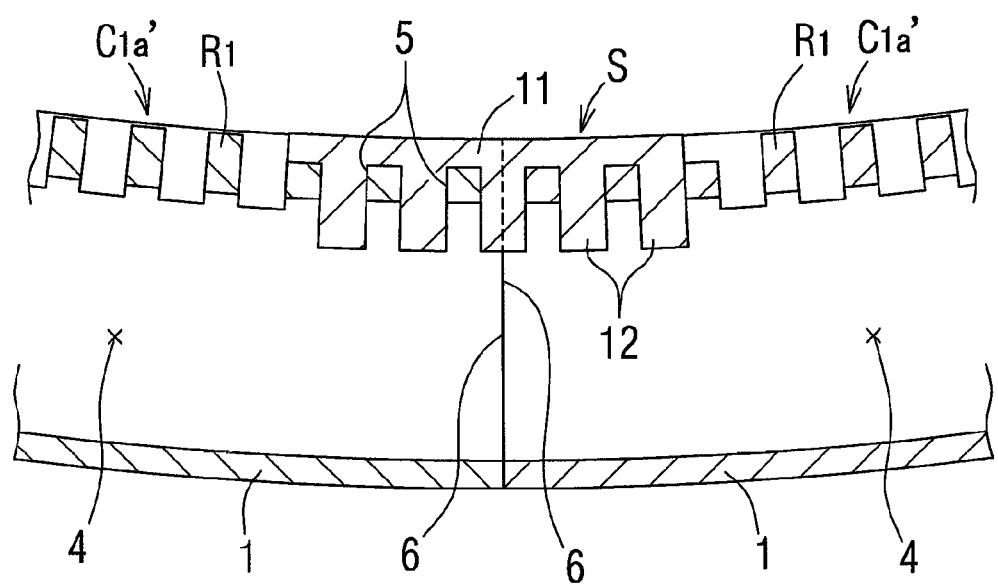
FIG. 5 is a partial enlarged longitudinal cross sectional view of the state where two divided tubes $C_{1a}'$ are connected with a connecting member S.

For facilitating the insertion of the divided tubes $C_{1a}'$ in the outer tire 51, the connecting member S also has a function of matching the phases in the circumferential direction of the two divided tubes $C_{1a}'$ to be connected with the end surfaces 6 thereof being confronted with each other, in addition to the function of connecting the two divided tubes $C_{1a}'$. As shown in FIGS. 1 and 5, the connecting member S has such a structure that contains the base plate 11 having provided thereinside plural engagement protrusions 12 that are to be inserted in and engaged with the plural hollow gaps 5 continuously formed in the divided tube $C_{1a}'$ bent into the intermediate state or the tube $C_1$. In the state where the two adjacent divided tubes $C_{1a}'$ are disposed to allow the end surfaces 6 thereof to be confronted with each other, the engagement protrusions 12 of the connecting member S are disposed over both the end parts of the two divided tubes $C_{1a}'$ and inserted in and engaged with the hollow gaps 5 of the respective divided tubes $C_{1a}'$, and thereby the adjacent two divided tubes $C_{1a}'$ are connected to each other on the inner circumferential side thereof. The base plate 11 of the connecting member S has a width J (see FIG. 1) that conforms to the width J of the recessed part 7 of the divided tube $C_{1a}'$ (which is the same as the length J in the circumferential direction of the first ribs $R_1$), thereby enabling the insertion of the base plate 11 in the recessed part 7 of the divided tube $C_{1a}'$. In the state where the three divided tubes $C_{1a}'$ are connected to each other in an annular shape with the connecting members S and are inserted in the annular space 52 of the outer tire 51, the connecting member S is disposed in the surplus space between the beads 54 of the outer tire 51, and thus is disposed without interference with both the outer tire 51 and the tire rim 53.

As described above, the end surfaces 6 of the divided tubes $C_{1a}$ in a circular arc shape inserted in the annular space 52 of the outer tire 51 are maintained as being confronted with each other with the tensile force (internal stress) in the longitudinal direction (annular direction) formed inside the outer tire 51, and thus the three divided tubes $C_{1a}$ are connected to each other as if they are integrated with each other in the annular space 52 of the outer tire 51. Furthermore, the divided tube $C_{1a}'$ after the secondary processing has a warpage with a larger radius than that of the divided tube $C_{1a}$ in the final shape, and on inserting the two connected divided tubes $C_{1a}'$ in the annular space 52 of the outer tire 51, the divided tubes $C_{1a}$ suffer substantially no deviation in phase. Due to these two points above, the divided tubes $C_{1a}'$ may be inserted in the outer tire 51 without the use of the connecting members S, but the use of the connecting members S further ensures matching of the phases in the circumferential direction of the two divided tubes $C_{1a}'$ adjacent to each other.

After inserting the tube $C_1$, which contains the three divided tubes $C_{1a}'$ bent in the intermediate form connected to each other in the annular shape with the connecting members S, in the annular space 52 of the outer tire 51, the tube $C_1$ is made close in contact with the inner circumferential surface of the outer tire 51, and simultaneously the end surfaces 6 of the divided tubes $C_{1a}$ constituting the tube $C_1$ are in close contact with each other entirely, with the substantially omnidirectional tensile forces (internal stress) containing mainly the forces formed in the outer tire 51 in the circumferential direction and the longitudinal direction (annular direction), and thereby the tube $C_1$ is inserted in the annular space 52 of the outer tire 51 with no space left in the transversal cross section and the longitudinal cross section, so as to complete the tire T (see FIG. 6).

In the case where the tube $C_1$ is used in a tire T for a Japanese city cycle, the tube $C_1$ undergoes elastic deformation with the outer tire 51 integrated therewith in such manner that the distance between the side parts 3 of the tube $C_1$ is increase with the ground pressure, as shown in FIG. 7B, and the city cycle runs while the impact forces received on bumps and the like are absorbed by the repulsive elasticity of the tube $C_1$. In the state where the city cycle is not used, the tube $C_1$ substantially restores the original shape as shown by the double-dashed line in the figure. Thus, as the tube $C_1$ undergoes elastic deformation with the outer tire 51 integrated therewith on running of the city cycle, even though the outer surface of the tube $C_1$ and the inner surface of the outer tire 51 causes slight slippage, the outer tire 51 is not damaged due to the slippage with the tube $C_1$ even after long-term use since the part of the outer surface of the tube $C_1$ that is in close contact with the inner surface of the outer tire 51 is a curved surface having no irregularity.

The properties of the tube according to the invention to be evaluated include the hardness and the bending elastic modulus, and the evaluation items thereof include the durability. For evaluating specific examples and comparative examples of the invention, the test methods for evaluating the hardness, the bending elastic modulus and the durability, used for measuring data in the specific examples and comparative examples, are shown briefly below in advance.

FIGS. 8A and 8B are a plan view and a side elevational view, respectively, of a tube hardness tester A developed by the present inventors, in which the tube is deformed in the transversal cross section thereof by applying an external force $F_0$ in the direction perpendicular to the axial direction of the tube, and the hardness of the tube is evaluated by a particular external force that provides a certain deformation amount of the tube. The hardness of the tube is an index of the resistance to the external force $F_0$, and is a property that relates to the bending elastic modulus of the thermoplastic elastomer constituting the tube. A tube supporting member 62 in a block shape is fixed at one end in a longitudinal direction of a base 61 in a rectangular shape, a movable pedestal 69 is supported slidably in a direction shown by the arrow Q on a guide plate 63 fixed at the center part of the base 61, a load gauge 65 is disposed on the upper surface of the movable pedestal 64, a screw rod 67 supported by a screw rod supporting member 66 is screwed in a nut (which is not shown in the figure) incorporated in the movable pedestal 64, and the movable pedestal 64 is slid in the direction shown by the arrow Q with rotation of a handle 68 provided at the end of the screw rod 67. The load gauge 65 has at a tip end thereof a pushing member 71 that pushes the outer circumferential surface of a divided tube $C_{1a}$" in the direction perpendicular to the axial direction thereof through a connecting rod 69. A pushing surface 71a on the front of the pushing member 71 is in a circular arc surface form for preventing the outer circumferential surface of the divided tube $C_{1a}$" from being damaged.

While holding the divided tube $C_{1a}$" between the tube supporting member 62 and the pushing member 71, the pushing member 71 is pushed onto the divided tube $C_{1a}$" by rotating the handle 68, and the external force at the time when the height dimension $H_0$ of the divided tube $C_{1a}$" in the transversal cross section thereof is decreased by ⅓ is measured with the load gauge 65. The pushing surface 71a on the front of the pushing member 71 is in a circular arc surface form, and the radius V of the circular arc surface is 50 mm. The particular external force $F_0$ thus measured with the tube hardness tester A is used as an index of the hardness of the tube. In general, a tube that is formed of a material having a large bending elastic modulus has larger hardness than a tube that is formed of a material having a small bending elastic modulus. In consideration of ensuring ride quality, the particular external force $F_0$ is preferably in a range of from 150 to 400 N (Newton). When the particular external force is less than 150 N, the tube may be too soft, and when the particular external force is more than 400 N, the tube may be too hard, both of which cases are not preferred for practical use. The test method for hardness of the tube described above is not a general standard but is a company standard.

The particular external force $F_0$ as an index of the hardness of the tube may vary depending on a bicycle, to which the tube is applied. For example, the particular external force $F_0$ may be approximately from 180 to 300 N for a Japanese city cycle, which is a versatile bicycle, and the particular external force $F_0$ may be approximately from 200 to 300 N and from 200 to 320 N for a mountain bike and an electric power assisted bicycle, respectively. The particular external force $F_0$ may be approximately from 225 to 350 N, from 250 to 400 N, and from 240 to 350 N for a hybrid bicycle, a road bicycle and a heavy cargo bicycle, respectively, to which a large grounding force and a large impact force are applied. The particular external force $F_3$ may be approximately from 150 to 200 N for an infant bicycle, to which only a smaller grounding force and a smaller impact force are applied.

Figure 9:
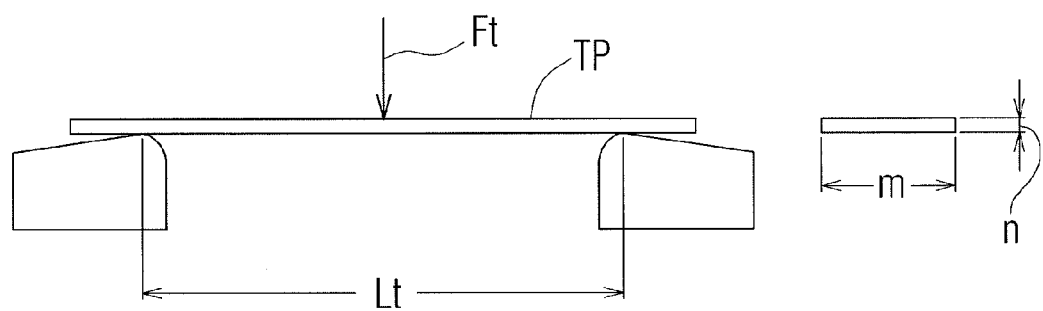
FIG. 9 is an illustration showing a test method for a bending elasticity of a test piece.

FIG. 9 is an illustration showing a test method for a bending elastic modulus of a test piece TP according to ASTM D790. The bending elastic modulus E (MPa) of the test piece TP with a distance between the supporting points Lt, a width m and a length n is shown by the following expression.

$$E=(Lt^3/4\ mn^3)\times(Ft/Z)$$

wherein Ft is a load (N) at a point arbitrarily selected on the initial linear portion of the load-deflection curve, and Z is the deflection (mm) at the load Ft.

The bending elastic modulus E is inversely proportional to the cube of the height n of the test piece TP, and therefore it is important in the tube $C_1$ to select the material of the tube $C_1$ and the thickness $t_{11}$ of the ground part 1 thereof for ensuring the ride quality.

Figure 10:
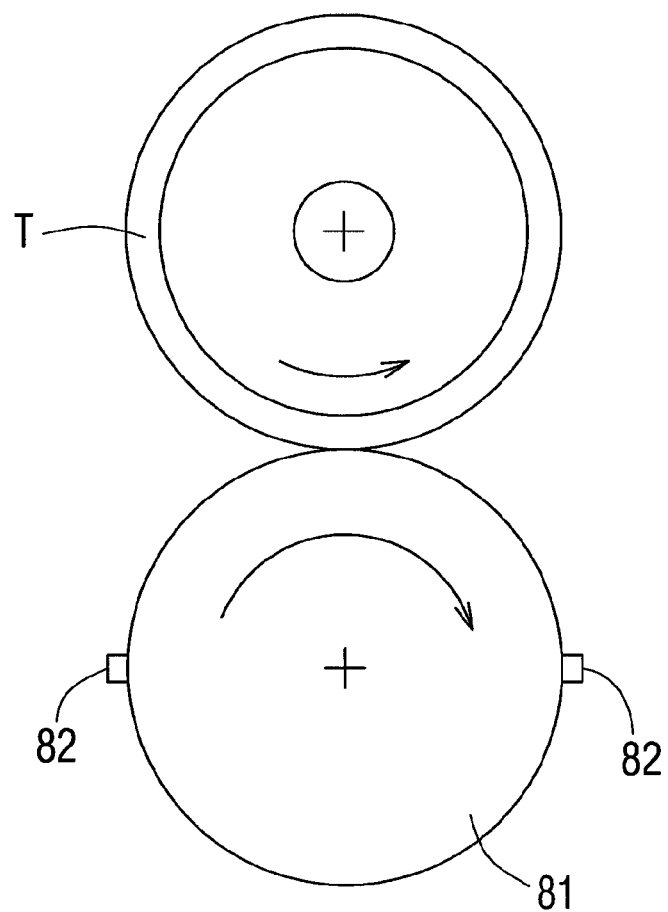
FIG. 10 is an illustration showing a running durability test of a tube.
Figure 12:
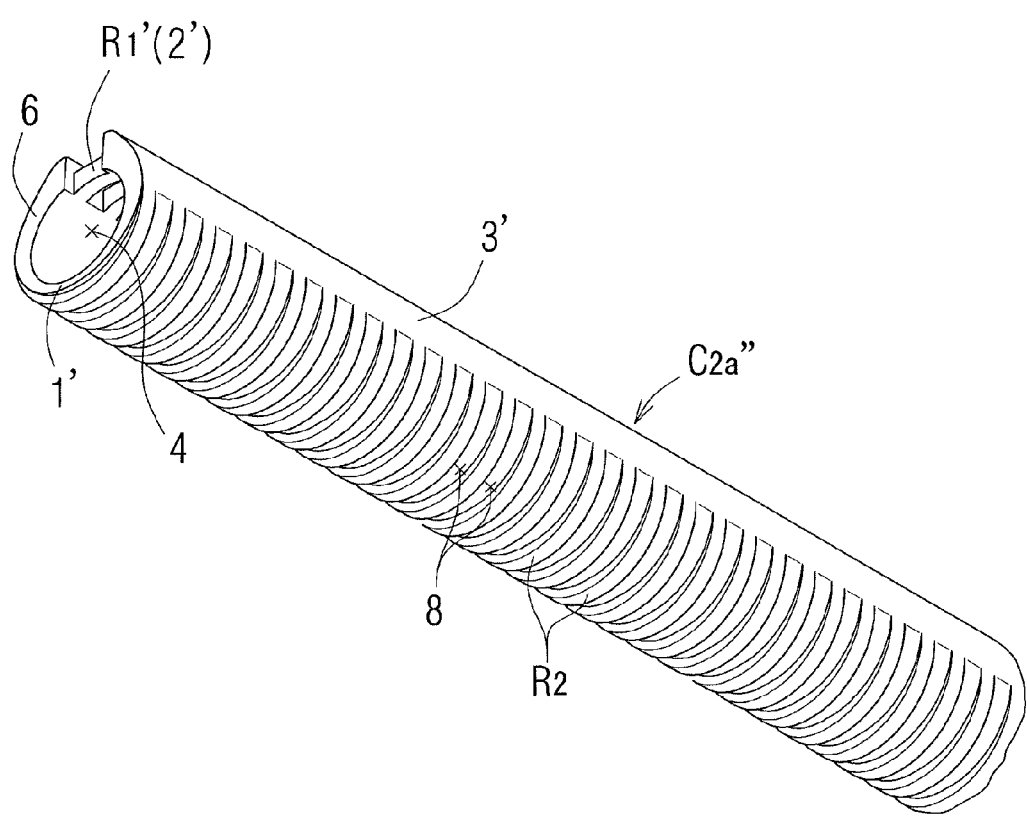
FIG. 12 is a perspective view showing a divided tube $C_{2a}"$ constituting a tube $C_2$.
Figure 13:
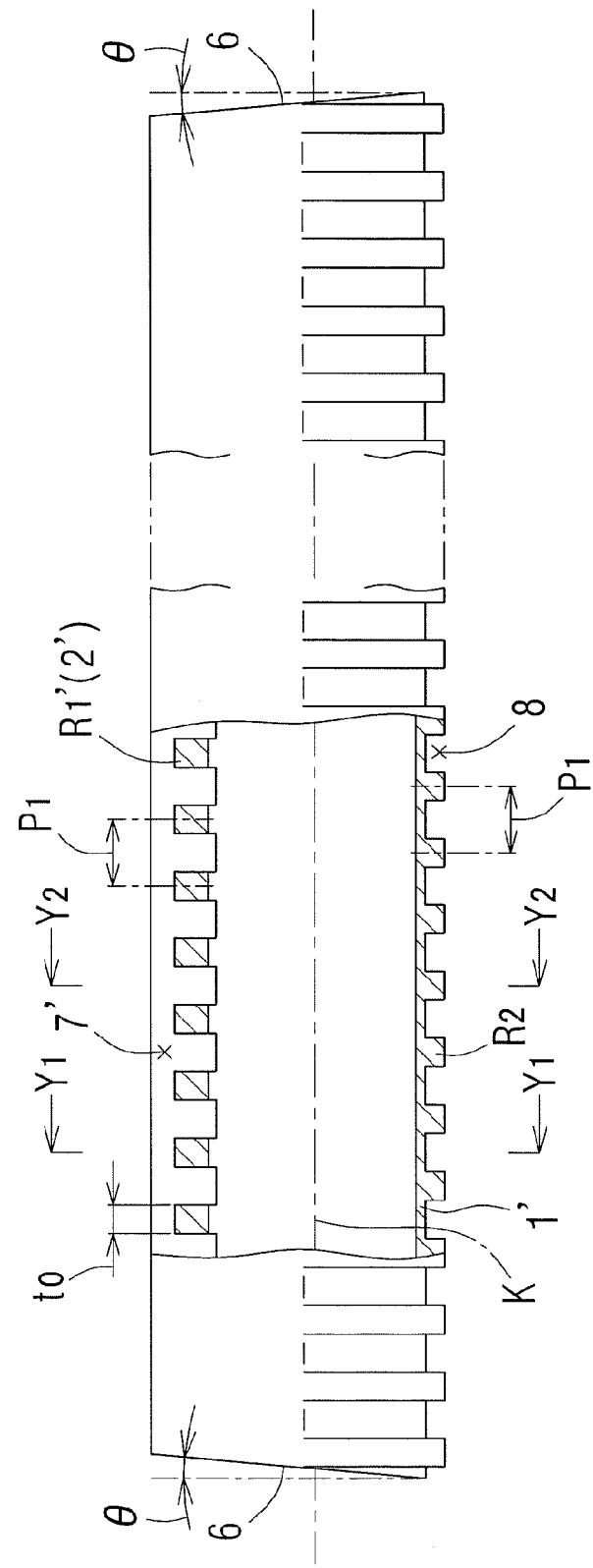
FIG. 13 is a cross sectional view of the divided tube $C_{2a}"$ in the longitudinal direction thereof (longitudinal cross sectional view).
Figure 15:
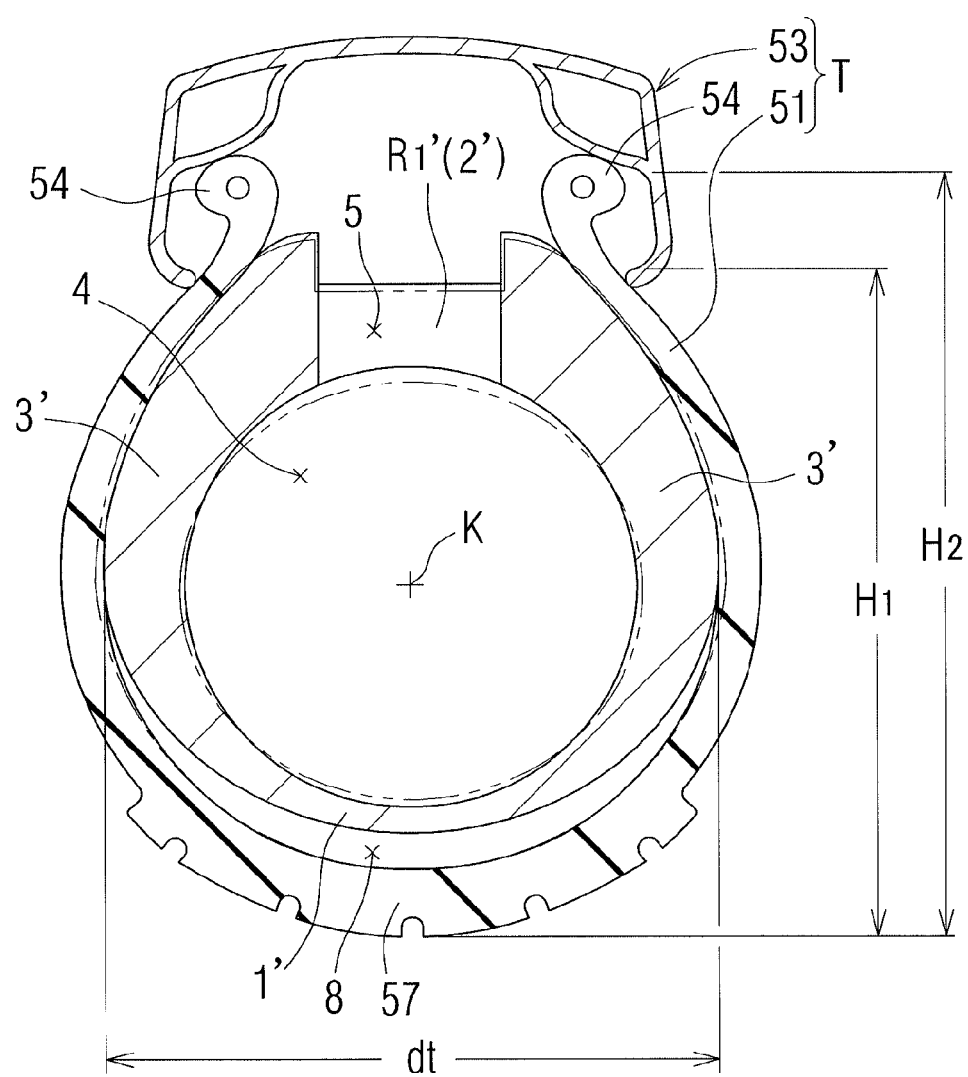
FIG. 15 is a transversal cross sectional view of a tire T having a tube $C_2$ inserted therein in a non-grounded state.

FIG. 10 is an illustration showing a method for a running durability test of a tube. The durability test is performed according to "7.2 Conditions for Running Durability Test" of JIS K6392-2011 (bicycle tire) in such a manner that while a tire T having a tube to be tested inserted therein is pressed onto a drum 81 under the maximum load of 50 kg, and the drum 81 is rotated at a surface velocity of 30 km/h for a running distance of 5,000 km. The drum 81 has an outer diameter of 760 mm and has shock bars 82 as simulating bump steps at the opposite positions thereof, and the shock bars each have a width of 10 mm and a height (step) of 5 mm. The results of the durability test are evaluated in terms of the extent of deformation of the tube and the presence of breakage of the rim.

FIG. 11 is a table showing Examples 1-a to 1-d and Comparative Examples 1-a to 1-c of the tube $C_1$ having a shape according to Example 1. The weight obtained by subtracting the weight (170 g) of the pneumatic tube from the weight per one tube is the weight increase from the pneumatic tube, which is preferably 500 g or less as the evaluation standard. The evaluation of the ride quality is the overall evaluation by monitors including the power required for running, the vibration from the ground and the impact from the steps. The evaluation of the durability of the tube is performed by the extent of deformation of the tube (small, medium and large) and the presence of breakage of the rim. The repulsive elastic modulus is a value obtained by a test method according to JIS K6255.

Examples 1-a to 1-c achieve the target value of 500 g for the weight increase from the pneumatic tube. Only Example 1-d fails to achieve the target value due to the larger thickness than the other examples, i.e., both the thickness $t_{11}$ at the ground part 1 and the thickness $t_{12}$ at the side part 3 of the tube $C_1$ are 1 mm to provide a weight increase from the pneumatic tube of 570 g, but Example 1-d provides good ride quality equivalent to the other examples due to the bending elastic modulus of 15 MPa, which is smaller than the other examples, thereby facilitating elastic deformation of the tube $C_1$, and thus provides an overall evaluation "acceptable". For the weight increase from the pneumatic tube, the ride quality and the durability, which are the basic evaluation items, Examples 1-a and 1-c are evaluated as the best, and Example 1-b is evaluated as "acceptable" since the tube has large hardness in the hardness test (harder tube) as compared to Examples 1-a and 1-c, and thus undergoes slight generation of vibration, but the ride quality thereof provides no practical problem.

Comparative Examples 1-a to 1-c, on the other hand, achieve the target value for the weight increase from the pneumatic tube, but Comparative Example 1-a provides poor ride quality due to generation of vibration caused by the large hardness of the tube in the hardness test (harder tube), and undergoes breakage of the tire rim in the durability test. Comparative Example 1-b undergoes large deformation of the tube due to the particularly small hardness of the tube in the hardness test (softer tube) to provide poor ride quality, e.g., larger power required for running provides heavy ride quality, and Comparative Example 1-c provides heavy ride quality due to the small repulsive elastic modulus, both of which are evaluated as "rejected".

Example 2

A tube $C_2$ of Example 2 will be described with reference to FIGS. 12 to 15. The tube $C_2$ of Example 2 is largely different from the tube $C_1$ of Example 1 only in the point that second ribs $R_2$ are provided over between the ground part 1 and the side parts 3, and the reminder of the basic structure thereof is equivalent to the tube $C_1$ of Example 1. Accordingly, the same parts are shown by the same symbols, the equivalent parts are shown by the same symbols with a prime ('), and only the different parts are described below. The transversal cross sectional shape of the divided tube $C_{2a}"$ of the tube $C_2$ is equivalent to the divided tube $C_{1a}"$ in Example 1, and has an irregular cylindrical shape having a hollow part 4 having an inner diameter $dc_2$ in transversal cross section, and circular arc grooves 8 are provided over between the ground part 1' and the side parts 3', in which the depth of the circular arc grooves 8 is gradually decreased from the ground part 1' toward the side parts 3', and thereby the second ribs $R_2$ in a circular arc shape are formed with the same pitch $P_1$ as the first ribs $R_1'$ provided on the side of the anti-ground part 2'. Accordingly, the height of the second ribs $R_2$ in a circular arc shape is gradually decreased from the ground part 1' toward the side parts 3', and the second ribs $R_2$ vanish at the side parts 3'. The second ribs $R_2$, which are provided by forming the circular arc grooves 8 over the ground part 1' to the side parts 3' of the divided tube $C_{2a}"$ with the constant pitch $P_1$, are formed for reducing the weight of the tube $C_2$. The transversal cross sectional shape of the tube $C_2$ herein may be referred to as a "ribbed ground part shape".

The anti-ground part 2' of the divided tube $C_2$ has a large number of the first ribs $R_1'$ with the constant pitch $P_1$ as similar to the tube $C_1$. The recessed part 7' on the outer circumferential side of the first rib $R_1'$ on the anti-ground part 2' has such a depth that on engaging the engagement protrusions 12 of the connecting member S with the hollow gaps 5', the base plate 11 does not protrude from the inner circumferential surface of the divided tube $C_{2a}"$, and thus the depth is larger than that of the recessed part 7 of the tube $C_1$. As a result, the thickness $t_{23}$ of the first ribs $R_1'$ on the anti-ground side 2' is smaller than the thickness $t_{13}$ of the first ribs $R_1$ of the tube $C_1$. The length J along the circumferential direction and the thickness to of the first ribs $R_1'$ are the same as the first ribs $R_1$ of the tube $C_1$. In FIGS. 14A and 14B, $dc_2$ denotes the inner diameter of the hollow part 4 of the tube $C_2$, and $Dc_2$ denotes the outer diameter in the transversal direction of the tube $C_2$ passing through the center K of the hollow part 4 of the tube $C_2$.

In the tube $C_2$, the ground part 1' has a large number of the circular arc grooves 8 extending in the circumferential direction formed with the constant pitch $P_1$ in the longitudinal direction, and thus the sum $(t_{21}+e)$ of the thickness $t_{21}$ of the part where the wall is formed continuously in the axial direction at the ground part 1' and the depth e of the circular arc grooves 8 is the substantial thickness of the ground part 1'. The tube $C_2$ is the same as the tube $C_1$ of Example 1 in such a point that the plural divided tubes $C_{2a}"$ are bent in a circular arc shape, and the end parts thereof are connected with the connecting members S to form the tube $C_2$ in an annular shape. Symbol $t_{22}$ denotes the thickness of the side part 3' of the tube $C_2$.

The second ribs $R_2$ are formed in the circumferential direction of the tube $C_2$ for resisting deformation of the ground part of the tube $C_2$, and thus on applying the ground pressure thereto, the ground part is not deformed excessively but is deformed within the proper range to ensure good ride quality. If the second ribs are formed in the longitudinal direction, the second ribs formed in the longitudinal direction fail to withstand the ground pressure, and the ground part is largely deformed on applying the ground pressure to deteriorate the ride quality, which is different from the case of the tube $C_2$. Furthermore, the presence of the second ribs $R_2$ facilitates absorption of the tensile strain on the outer circumferential side of the tube on bending the single tube into an annular shape or the divided tube into a circular arc shape, whereby the bending operation is facilitated, and the cross sectional shape of the tube is substantially prevented from being changed after bending.

The second ribs $R_2$ are in contact with the inner circumferential surface of the outer tire 51 in the ground part of the outer tire 51, but the inner circumferential surface of the outer tire 51 is substantially not damaged with the second ribs $R_2$. This is because the outer tire 51 has a particularly large thickness in the ground part, the deviation in the circumferential direction and the longitudinal direction between the tube $C_2$ and the outer tire 51 in deformation of the tube $C_2$ and the outer tire 51 on application of the ground pressure is significantly smaller in the ground part than in the part near the anti-ground part 2' or is substantially not present, and the inner circumferential surface of the outer tire 51 is less damaged since the second ribs $R_2$ have no component in the longitudinal direction of the tube $C_2$.

As a result, Examples 2-a to 2-c achieve the target value of 500 g for the weight increase from the pneumatic tube. Only Example 2-d slightly fails to achieve the target value due to the larger thickness than the other examples, i.e., the thickness $t_{22}$ at the side part 3' of the tube $C_1$ is 4.5 mm to provide a weight increase from the pneumatic tube of 530 g, but Example 2-d provides good ride quality equivalent to the other examples due to a bending elastic modulus of 15 MPa, which is smaller than the other examples, thereby facilitating elastic deformation of the tube $C_1$, and thus provides an overall evaluation "acceptable". For the weight increase from the pneumatic tube, the ride quality and the durability, which are the basic evaluation items, Examples 2-a and 2-c are evaluated as the best, and Example 2-b is evaluated as "acceptable" due to the large bending elastic modulus as compared to Examples 2-a and 2-c, and thus undergoes slight generation of vibration, but the ride quality thereof provides no practical problem. Examples 2-a to 2-d are all different from the tube $C_1$ of Example 1 in such a point that the inner circumferential surface of the tire T on the side of the ground part 57 is slightly worn due to the presence of the second ribs $R_2$ to such an extent that provides no practical problem and accordingly, different results are obtained.

Comparative Example 2-a, on the other hand, is the same as Example 2-a in the raw material resin, the dimensions and the repulsive elastic modulus of respective portions of the tube $C_2$, but because of the larger values of the bending elastic modulus and the hardness of the tube than Example 2-a, Comparative Example 2-a shows deteriorated ride quality due to generation of severe vibration and poor durability due to the breakage of the tire rim 53, and thus is evaluated as "rejected".

Example 3

Figure 17:
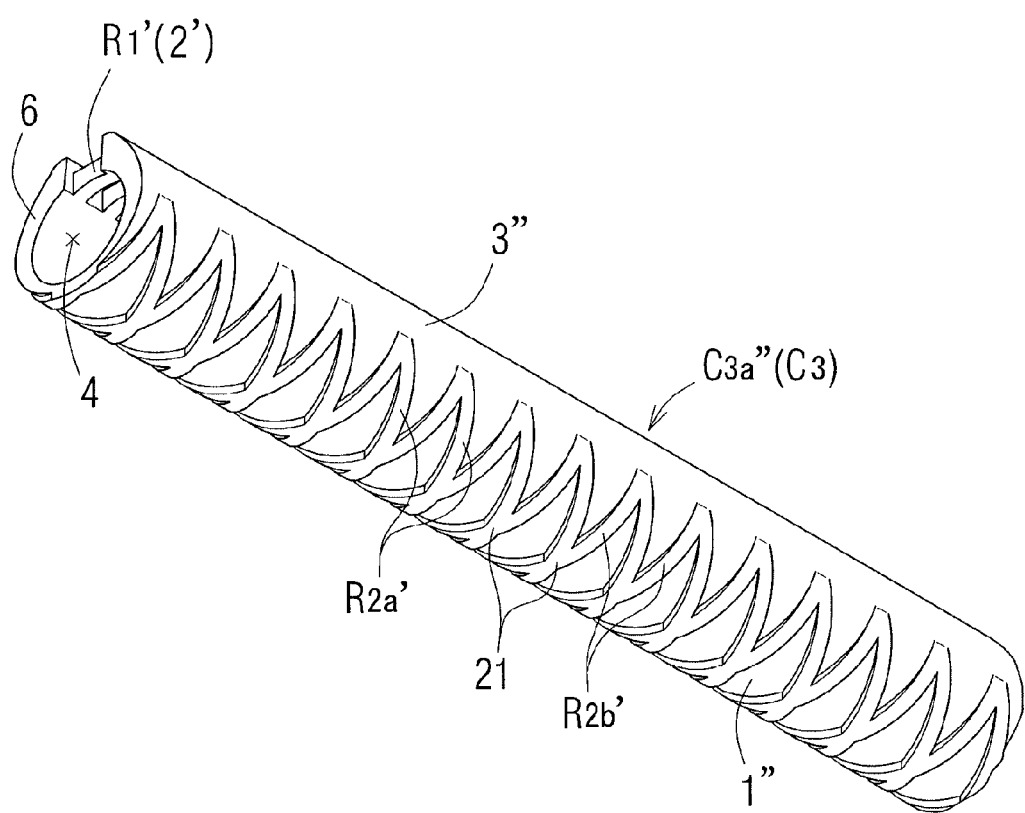
FIG. 17 is a perspective view showing a divided tube $C_{3a}"$ constituting a tube $C_3$.
Figure 18:
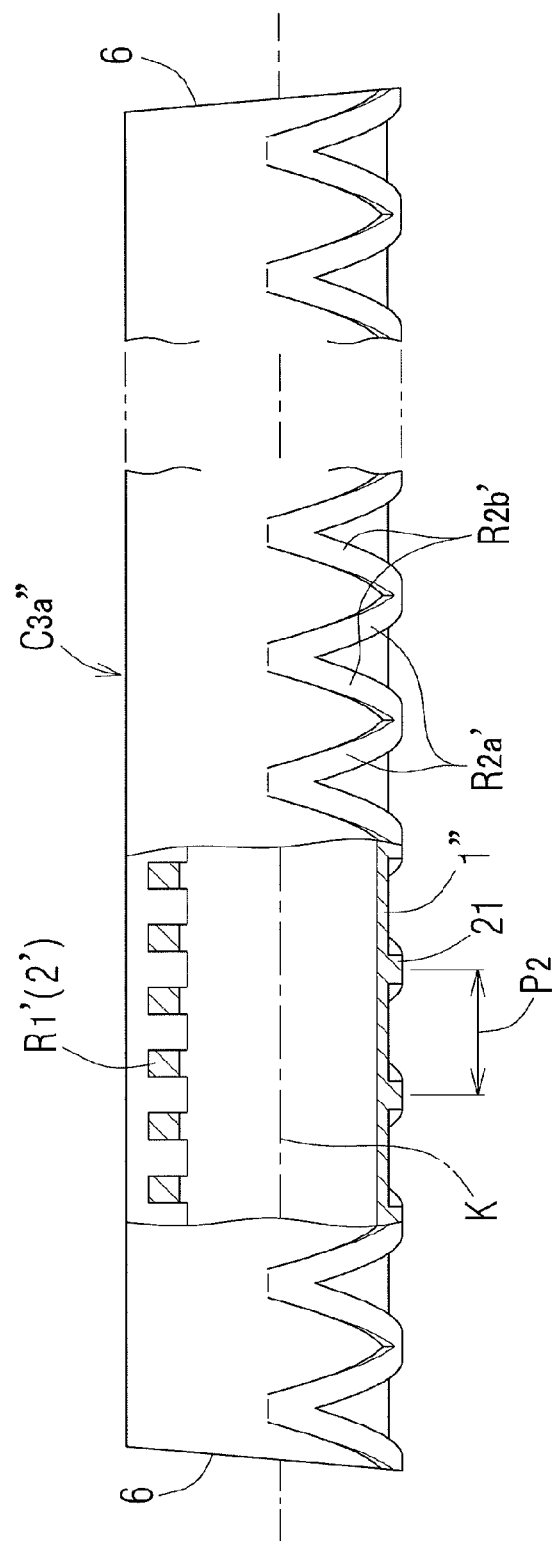
FIG. 18 is a longitudinal cross sectional view of the divided tube $C_{3a}"$ in the longitudinal direction thereof.
Figure 19:
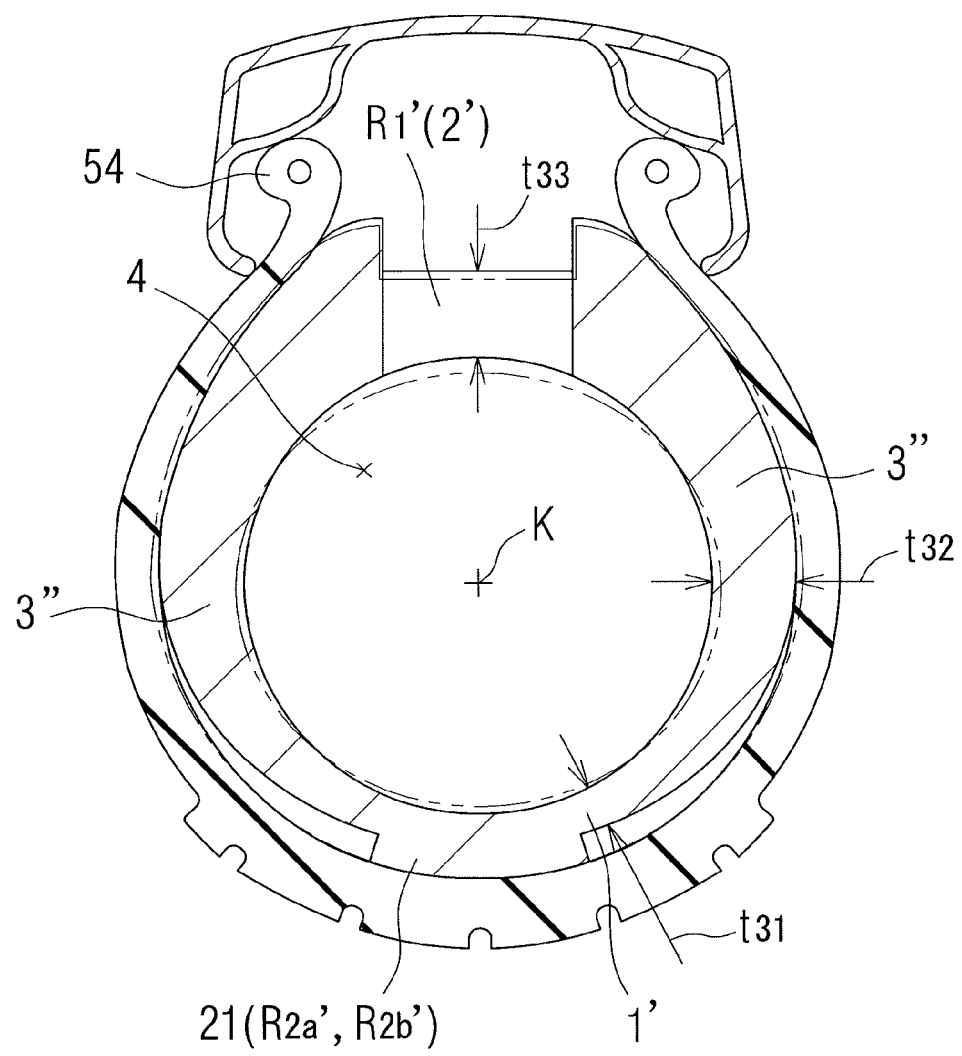
FIG. 19 is a transversal cross sectional view of a tire T having a tube $C_3$ inserted therein in a non-grounded state.

A tube $C_3$ of Example 3 will be described with reference to FIGS. 17 to 19. The tube $C_3$ of Example 3 is different from the tube $C_2$ of Example 2 in the point that the shape of the second ribs $R_{2a}'$ and $R_{2b}'$ formed on the outer circumferential surface of the ground part 1" is different therefrom, and the reminder of the structure thereof is equivalent to the tube $C_2$. Accordingly, the same parts are shown by the same symbols, and the second ribs $R_2'$ as the sole difference are described below.

The second ribs $R_{2a}'$ and $R_{2b}'$, which are slanted forward and backward respectively, are formed on the outer circumferential surface of the ground part 1" of the divided tube $C_{3a}"$, and the second ribs $R_{2a}'$ and $R_{2b}'$ intersect with each other at the bottom position of the ground part 1", which is demanded to have the largest strength against the ground pressure, thereby providing a desirable structure for ensuring the strength of the tube $C_3$. The tube $C_3$ is reduced in weight by providing the second ribs $R_{2a}'$ and $R_{2b}'$, which are slanted forward and backward respectively, are formed on the outer circumferential surface over between the ground part 1" and the side parts 3" of the divided tube $C_{3a}"$. The second ribs $R_{2a}'$ and $R_{2b}'$, which are slanted forward and backward respectively, have components in the longitudinal direction of the tube $C_3$, but the components have a short length, and only the ground part and the side parts are partially elastically deformed in the longitudinal direction (annular direction) of the tube $C_3$ on application of the ground pressure, thereby providing ride quality that is in a range providing no practical problem. In FIGS. 17 to 19, numeral 21 denotes the intersections of the second ribs $R_{2a}'$ and $R_{2b}'$.

On forming the tubes $C_1$ to $C_3$ of Examples 1 to 3 having an annular shape by connecting the divided tubes $C_{1a}$ to $C_{3a}$ in a circular arc shape, which are obtained by bending the divided tubes $C_{1a}"$ to $C_{3a}"$ in a straight shape before bending, with the connecting members S at the anti-ground part thereof, as the connecting parts at the end parts of the divided tubes $C_{1a}"$ to $C_{3a}"$ have low restriction against deformation in the transversal cross section as compared to the other parts than the end parts, the degree of deformation in the transversal cross section is large as compare to other parts, and as a result, the transversal cross sectional shape of the tubes $C_1$ to $C_3$ in an annular shape may fluctuate and influence the ride quality.

Figure 22:
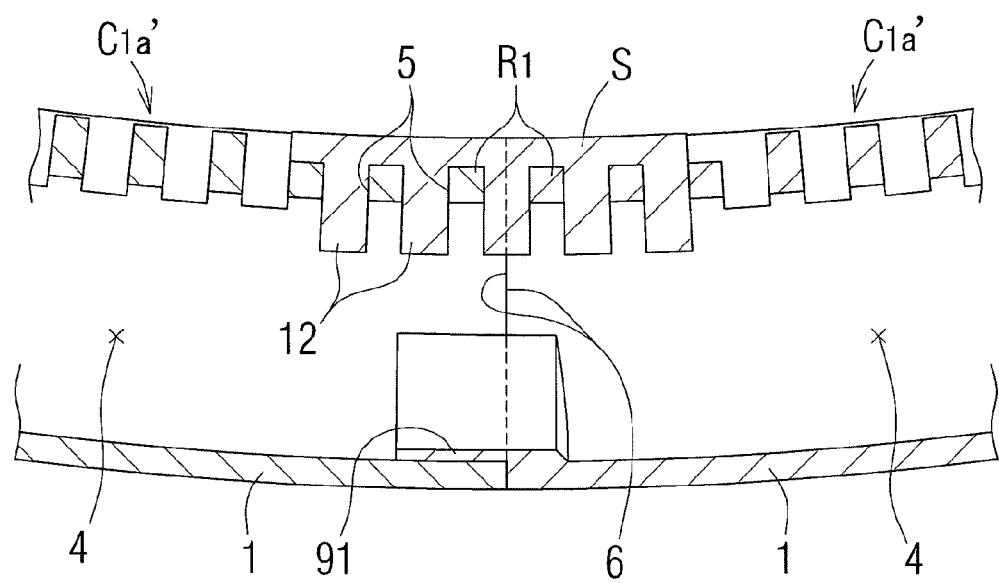
FIG. 22 is a partial longitudinal cross sectional view of the state where a deformation preventing piece 91 provided on one divided tube $C_{1a}'$ engages with a hollow part of another divided tube $C_{1a}'$.

As shown in FIGS. 21 and 22, accordingly, the divided tube $C_{1a}"$ of Example 1 may have integrated therewith a deformation preventing piece 91 in the form of a tongue having a circular arc cross sectional shape, which protrudes by a predetermined length in the longitudinal direction from the inner circumferential surface of the ground part having a smaller thickness at the end parts. It is preferred that the deformation preventing piece 91 has a thickness that is gradually decreased from the center toward the both side parts thereof in the transversal cross section, and is provided over an approximately half of the inner circumferential surface of the divided tube $C_{1a}"$. The maximum thickness and the protrusion length from the end surface of the deformation preventing piece 91 are preferably approximately 1 mm and 10 mm, respectively, for a Japanese city cycle. When the thickness of the deformation preventing piece 91 is too small, the function of preventing the deformation in the transversal cross section of the divided tubes $C_{1a}"$ to $C_{3a}"$ may be poor, and when the thickness is too large, vibrations may be caused thereby and may deteriorate the ride quality.

Accordingly, on bending the divided tubes $C_{1a}"$ in a circular arc shape and connecting them by allowing the end surfaces 6 thereof to be in pressure-contact with each other as shown in FIG. 22, the deformation preventing piece 91 provided on one of the divided tubes $C_{1a}"$ integrated therewith is inserted into the hollow part 4 of the other divided tube $C_{1a}"$ and is made in close contact with the inner circumferential surface of the hollow part 4. As a result, the thin part on the ground part of the other divided tube $C_{1a}"$ is reinforced, and simultaneously the divided tube $C_{1a}"$ having integrated therewith the deformation preventing piece 91 is also reinforced. Thus, the end parts of the divided tubes are prevented or suppressed from being deformed in the transversal cross section on application of the ground pressure on using the divided tubes $C_{1a}"$, and thereby the good ride quality is ensured.

Figure 23:
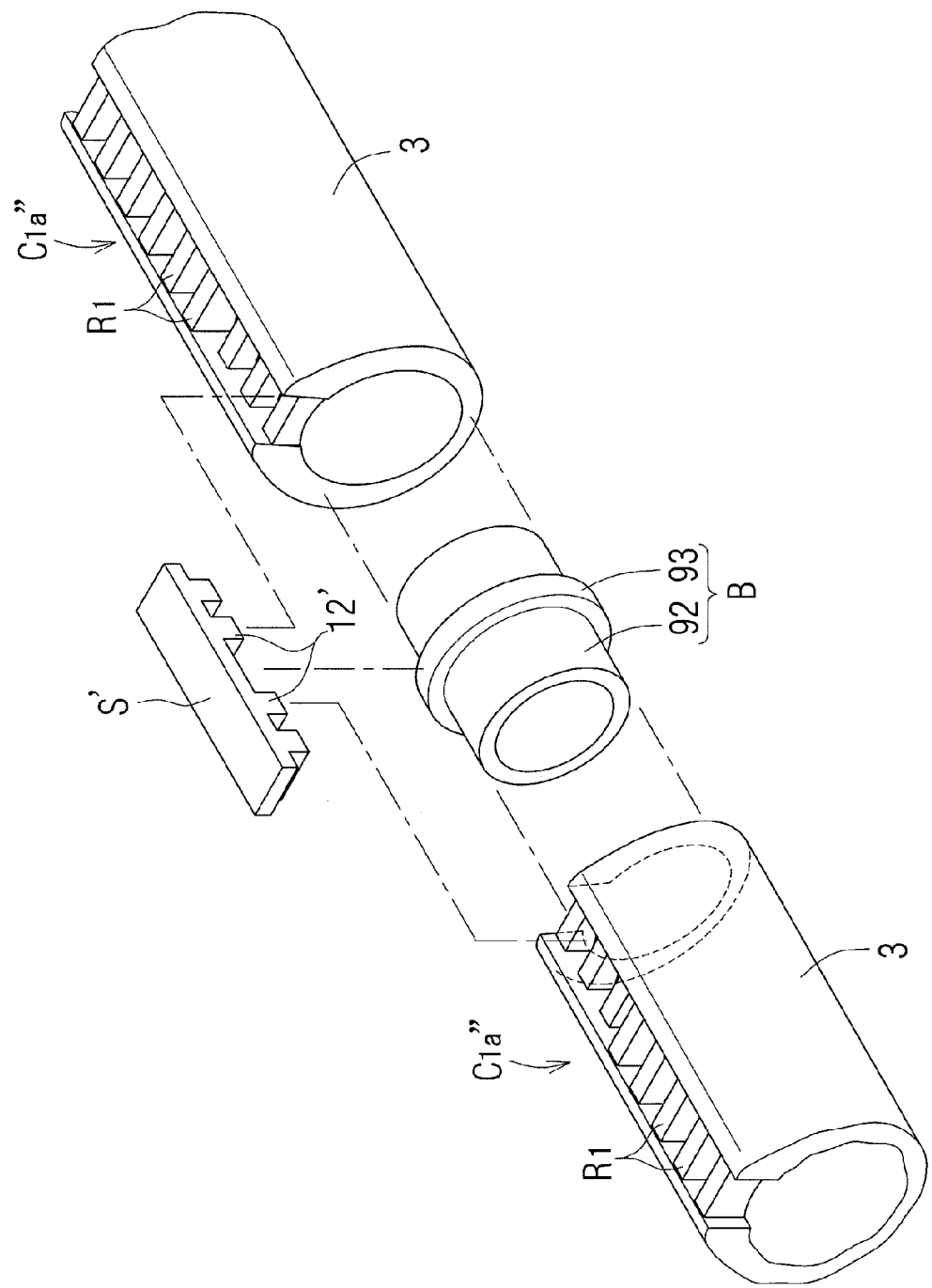
FIG. 23 is a perspective view showing a deformation preventing member B having another structure that is inserted to end parts of divided tubes $C_{1a}"$ to be connected to each other.
Figure 24:
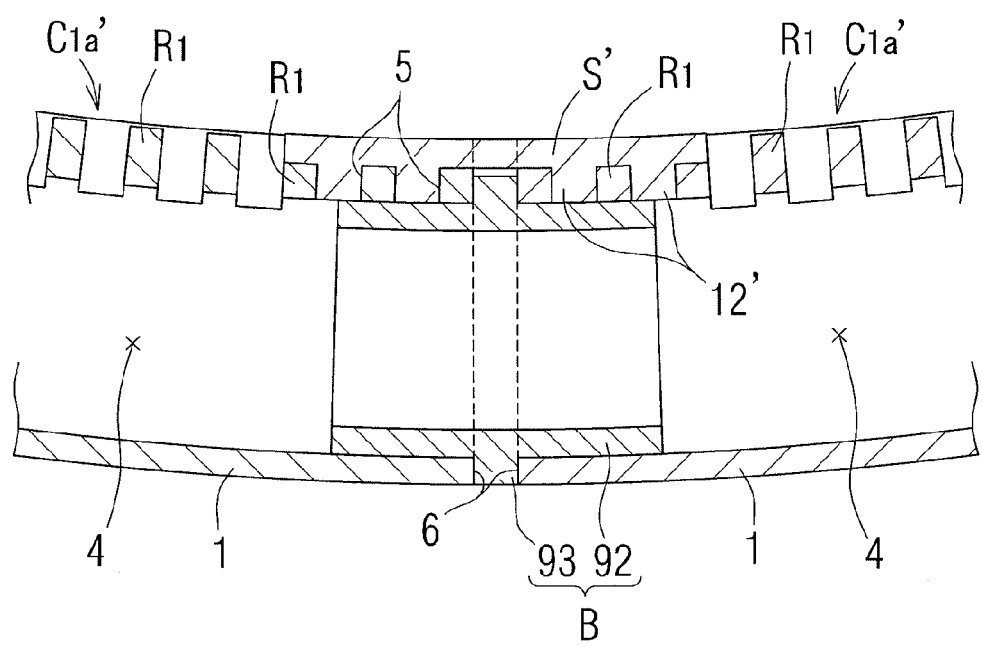
FIG. 24 is a partial longitudinal cross sectional view of the state where a deformation preventing member B having another structure is inserted to end parts of divided tubes $C_{1a}"$ connected to each other.

FIGS. 23 and 24 show a deformation preventing member B having another structure. The deformation preventing member B is molded with a soft elastomer that does not impair the natural deformation of the tube $C_1$ with the ground pressure, and has a structure containing a deformation preventing member body 92 having a short cylindrical shape, which is to be inserted into the hollow parts of the divided tubes $C_{1a}$ connected to each other, and a stopper 93 provided at the center in the axial direction of the deformation preventing member body 92.

As shown in FIG. 24, the parts formed by dividing the deformation preventing member body 92 into two in the axial direction are inserted in the hollow parts 4 at the end parts of the divided tubes $C_{1a}$ connected to each other, and the stopper 93 is held between the end surfaces 6 of the divided tubes $C_{1a}$. The function of preventing or suppressing the deformation in the transversal cross section of the end parts, which are the connecting parts of the divided tubes $C_{1a}$, achieved by the deformation preventing member B is equivalent to that of the deformation preventing piece 91 described above. In FIG. 24, symbol S' denotes a connecting member having engagement protrusions 12' having a short length.

Figure 25:
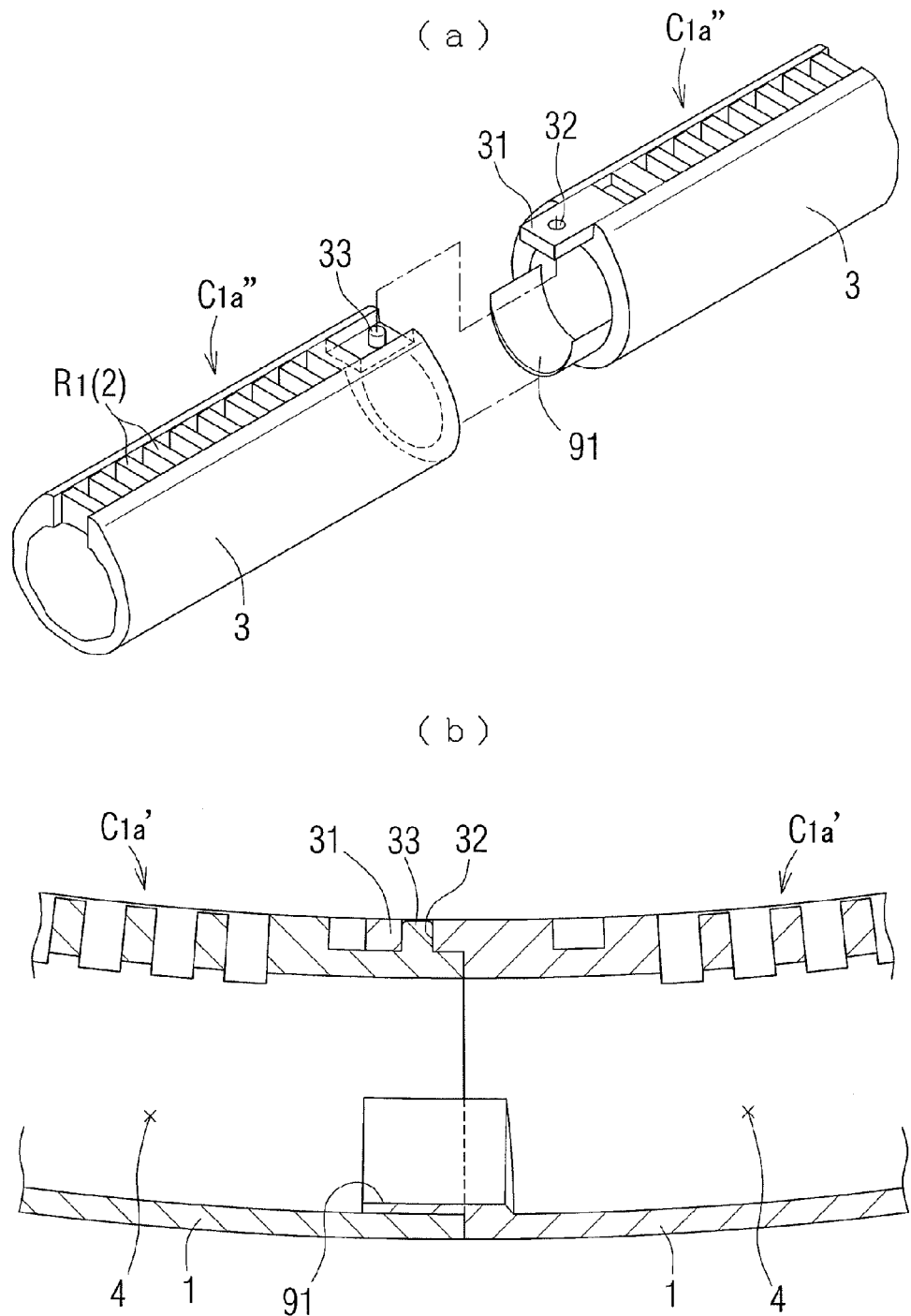
FIGS. 25A and 25B are a perspective view and a partial longitudinal cross sectional view, respectively, showing a structure where two divided tubes $C_{1a}"$ or $C_{1a}'$ are connected with a connecting piece 31 provided integrated therewith on one end in the longitudinal direction of the divided tube $C_{1a}"$ or $C_{1a}'$ on an anti-ground side, before connecting (FIG. 25A) and after connecting (FIG. 25B).

As shown in FIGS. 25A and 25B, the divided tube $C_{1a}"$ may have a connecting piece 31 having a connecting hole 32, which protrudes in the longitudinal direction from one end on the side of the anti-ground part, and also at the other end of the anti-ground part thereof, a connecting protrusion 33, which is to be engaged with the connecting hole 32 of the connecting piece 31 provided in the other divided tube $C_{1a}"$. Accordingly, the connecting hole 32 of the connecting piece 31 of one of the divided tubes $C_{1a}"$ is engaged with the connecting protrusion 33 of the other divided tube $C_{1a}"$, and thereby the two divided tubes $C_{1a}"$ are connected to each other without relative rotation in the circumferential direction.

The tubes $C_1$ to $C_3$ of Examples 1 to 3 have excellent ride quality with the light weight property and the durability, which are achieved mainly by the repulsive elasticity inherent to the thermoplastic elastomer and the combination of the repulsive elasticity and the total shape of the tube. For achieving the light weight property, the weight decrease of the tube by approximately from 5 to 20% may be achieved only by adding a foaming agent in an amount of from 1 to 3 parts by weight per 100 parts by weight of the resin material.

In all Examples 1 to 3, the plural divided tubes, which are formed by dividing a single tube into plural members, are connected at the end parts of the divided tubes with connecting members, and these embodiments may be effective, for example, in the case where the length of the molded article is restricted such as in injection molding. In the invention, however, a tube in a single rod shape may be bent into an annular shape, and the end parts thereof may be connected with a connecting member, when the tube in a single rod shape can be molded.

In Examples 1 to 3, the hollow gaps among the first ribs formed on the inner circumferential side of the tube are utilized as an engagement part, with which the engagement protrusions of the connecting member are engaged, for reducing the tube in weight, and thus such an advantage may be obtained that a dedicated connecting part may not be provided on the end parts in the longitudinal direction of the tube or the divided tube. In the invention, however, the structures of the parts to be connected and the connecting member provided on the end parts for connecting the end parts of the tube having a single rod shape or the divided tubes in a circular arc shape are not limited to the aforementioned structures, and any structure may be appropriately employed.

The puncture-free inner tube of the invention may be used as an inner tube of a tire for a Japanese city cycle and also for a mountain bike, an electric power assisted bicycle, a hybrid bicycle, a road bicycle, a heavy cargo bicycle, an infant bicycle, a wheelchair, a mobility scooter and the like.

What is claimed is:

1. A puncture-free inner tube having a hollow pipe shape, which is to be inserted in an annular space of an outer tire having an annular shape, which is to be mounted detachably on a tire rim having an annular shape,
    the puncture-free inner tube comprising a thermoplastic elastomer that is molded by injection molding into a transverse cross sectional shape that is similar or substantially similar to and is slightly larger than a transverse cross section of the annular space of the outer tire,
    the puncture-free inner tube having a thickness that is gradually increased from a ground part toward an anti-ground part on a side of the tire rim,
    the puncture-free inner tube being formed in total into an annular shape, and the puncture-free inner tube being insertable in the annular space of the outer tire in a compressed state with a tensile stress of the outer tire,
    wherein the puncture-free inner tube has, in the anti-ground part on the inner circumferential side thereof facing the tire rim, a continuous opening along an inner circumferential direction of the puncture-free inner tube,
    the puncture-free inner tube further comprising a plurality of ribs positioned in the continuous opening and spaced along the inner circumferential direction with a constant pitch, thereby forming a partially open structure.

2. The puncture-free inner tube according to claim 1, wherein the tube contains plural divided tubes that are connected to each other at end parts thereof to form the annular shape, and the end parts, that are adjacent to each other, are connected to each other through a connecting unit so that the plural divided tubes form the annular shape.

3. The puncture-free inner tube according to claim 2, wherein the divided tubes each have integrated therewith a connecting piece that is protruding at a part of one of the end parts on a side of the anti-ground part, and
    the connecting unit includes a connecting hole that is formed in the connecting piece and a connecting protrusion that is formed in the divided tubes at a part of the other of the end parts thereof on a side of the anti-ground part, and the connecting protrusion is to engage with the connecting hole.

4. The puncture-free inner tube according to claim 2, wherein the divided tubes to be connected each have integrated therewith as a protrusion forming a deformation preventing piece at one of the end parts on an inner circumferential surface of the ground part, and the deformation preventing piece engages with an inner circumferential surface of the other divided tube, thereby preventing the end parts of the divided tubes connected to each other from being deformed in a transversal cross section.

5. The puncture-free inner tube according to claim 1, wherein the puncture-free inner tube in a single pipe form or plural divided tubes to be connected into an annular shape have end surfaces that each are tilted at a prescribed angle in the longitudinal direction for preventing the end surfaces from interfering with each other.

6. The puncture-free inner tube according to claim 1, wherein the puncture-free inner tube contains plural divided tubes that are connected to each other at end parts thereof to form an annular shape, and the end parts, that are adjacent to each other, are connected to each other through a connecting unit so that the plural divided tubes form the annular shape,
    wherein each of the connecting units is a separately provided connecting member, and the connecting member has plural engagement protrusions in a form of a shelf, and
    wherein the engagement protrusions each engage with a gap between the ribs.

7. The puncture-free inner tube according to claim 1, wherein when hardness of the puncture-free inner tube in a single pipe form or the divided tube is determined based on a particular external force that reduces a height dimension of the tube or the divided tube by ⅓ upon applying the external force to the tube or the divided tube, which is prevented from moving, in a direction perpendicular to the longitudinal direction or the bending direction of the tube or the divided tube, the particular external force is from 150 to 400 N.

8. The puncture-free inner tube according to claim 1, wherein the ribs extend in a direction that is transverse to the inner circumferential direction.

9. A puncture-free inner tube having a hollow pipe shape, which is to be inserted in an annular space of an outer tire having an annular shape, which is to be mounted detachably on a tire rim having an annular shape,
    the puncture-free inner tube comprising a thermoplastic elastomer that is molded by injection molding into a transverse cross sectional shape,
    the transverse cross sectional shape having a thickness that is gradually increased from a ground part toward an anti-ground part to be disposed on a side of the tire rim,
    the puncture-free inner tube having, in the anti-ground part, a continuous opening along a longitudinal direction of the tube,
    the puncture-free inner tube further comprising a plurality of ribs positioned in the continuous opening and spaced along the longitudinal direction with a constant pitch before being formed or bent annularly, thereby forming a partially open structure,
    the puncture-free inner tube being insertable into the annular space of the outer tire in a compressed state with a tensile stress of the outer tire.

10. The puncture-free inner tube according to claim 9, wherein the ribs extend in a direction that is transverse to the longitudinal direction.

* * * * *